US007143398B2

(12) United States Patent
Chang et al.

(10) Patent No.: US 7,143,398 B2
(45) Date of Patent: Nov. 28, 2006

(54) APPLICATION INFA OPERATING SYSTEM

(75) Inventors: Che-An Chang, 3Fl., No.45, Lane 201, Kangle St., Neihu Chiu, Taipei (TW); Tze-Hao Chang, Taipei (TW); Jar-Chang Jang, Taipei (TW); Shu-Wei Chang, Taipei (TW)

(73) Assignee: Che-An Chang, Taipei (TW)

( * ) Notice: Subject to any disclaimer, the term of this patent is extended or adjusted under 35 U.S.C. 154(b) by 647 days.

(21) Appl. No.: 10/386,699

(22) Filed: Mar. 13, 2003

(65) Prior Publication Data

US 2004/0181797 A1 Sep. 16, 2004

(51) Int. Cl.
*G06F 9/45* (2006.01)

(52) U.S. Cl. .................. 717/137; 717/147; 703/26

(58) Field of Classification Search ............... 717/147, 717/134, 138, 110, 137; 703/26, 27, 28; 712/209, 227
See application file for complete search history.

(56) References Cited

U.S. PATENT DOCUMENTS

| | | | | |
|---|---|---|---|---|
| 6,075,938 A * | 6/2000 | Bugnion et al. | ............... | 703/27 |
| 6,230,118 B1 * | 5/2001 | Bader et al. | .................. | 703/24 |
| 6,311,327 B1 * | 10/2001 | O'Brien et al. | ............. | 717/114 |
| 6,397,242 B1 * | 5/2002 | Devine et al. | .................. | 718/1 |
| 6,453,277 B1 * | 9/2002 | Helsley et al. | ................ | 703/24 |
| 6,564,179 B1 * | 5/2003 | Belhaj | ......................... | 703/26 |
| 6,704,925 B1 * | 3/2004 | Bugnion | ..................... | 717/138 |
| 6,813,770 B1 * | 11/2004 | Allavarpu et al. | .......... | 719/316 |
| 6,836,883 B1 * | 12/2004 | Abrams et al. | ............ | 717/140 |
| 6,915,324 B1 * | 7/2005 | Allavarpu et al. | .......... | 709/200 |
| 7,007,264 B1 * | 2/2006 | Baxter | ......................... | 716/18 |
| 7,020,766 B1 * | 3/2006 | Wang et al. | ................ | 712/227 |
| 7,076,772 B1 * | 7/2006 | Zatloukal | .................... | 717/147 |
| 7,089,377 B1 * | 8/2006 | Chen | .......................... | 711/147 |

FOREIGN PATENT DOCUMENTS

| EP | 0810522 | * 12/1997 |
|---|---|---|
| EP | 810522 A2 | * 12/1997 |

OTHER PUBLICATIONS

"Tao's Object-Oriented Operating System seeks to Enhance Java for Embedded Apps", Peter Clarke, EE Times, Feb. 10, 1998, 1 page.*
"Tao Shrinks Java for Embedded Systems with Elate Java Engine", Feb. 6, 1998, 1 page.*
"Tao Brings Its Super Skinny Operating System Elate To Market", Computergram International, Jan. 19, 1998, 1 page.*

(Continued)

*Primary Examiner*—Todd Ingberg
(74) *Attorney, Agent, or Firm*—Rosenberg, Klein & Lee

(57) ABSTRACT

An application infa operating system (AIOS) is provided. The AIOS provides an operating platform for integrating, embedding, managing and controlling an application program, wherein a main function thereof is to integrate different application programs which are developed from different information companies and different program designers via different developing languages and tools (e.g., C, C++, database, or Java, etc.) for mutually conversing and swapping data at different space-times through the integration of the present invention, so as to benefit an update, an upgrade and an integration of the application programs, shorten a developing time of integrating a new and a old systems, and save a cost of developing a system for improving a re-use rate of the application programs. The present invention provides a man machine interface (MMI) and a tool software for overall controlling the application program, effectively controlling a system efficiency, and enhancing a stability of the application program system.

14 Claims, 39 Drawing Sheets

OTHER PUBLICATIONS

"Tao Launches Object-Oriented Operating System", Perter Clarke, Feb. 11, 1998, 1 page.*

"The Taos Operating System Uses Objects from the Ground Up to Enable Processors Based on Different Architectures to Work on the Same Problem", Dick Pountain, Jul. 1994, 1 page.*

The Taos (Dow-os) Operating System, The Acorn Computer User WWW Server Documents, Oct. 21, 1994, 11 pages.*

"Coordination and Virtualization: The Role of Electronic Networks and Personal Relationships", Robert Kraut et al. Organization Science, 1999, pp. 722-740.*

"VMware Memory Resource Management Paper Wins OSDI Best Paper Award", VMware, Dec. 30, 2000, 1 page.*

Programmer's Paradise Recognizes VMware Workstation as Top Selling Product in 2001, VMware, Mar. 7, 2002, 2 pages.*

"Software Development Magazine Honors Market Leader in Virtualization Software for Intel Computers", Apr. 13, 2001, 2 pages.*

PC Magazine Has Named VMware Ic. the winner of its year 2000 Technical Excellence Award for Software, Nov. 14, 2000, 1 page.*

VMware Used for Multi-Platform Development, Feb. 24, 2000, 2 pages.*

Google Deploys VMware Software, Mar. 13, 2000, 2 pages.*

VMware Enables Intel Server Customers to Scale Their Internet Computing Intrastructures Safely, Reliably and on Demand, Dec. 5, 2000, 3 pages.*

Sam's Teach Yourself MCSE Windows NT Workstation 4 in 14 Days, Robert Bogue et al, 1998, pp. 384-407.*

Relocating Machine Instructions by Currying, ACM, Norman Ramsey, 1996, pp. 226-236.*

Tool Interface Standards (TIS) relocatable Object Module Format (OMF) Specification, Version 1.1, May 1995, Whole Manual.*

* cited by examiner

AIOS Service Table

| Seq | ... | System_Name | Service_Name | Session | I/O Address | ... | Program_Path | I/O Format |
|---|---|---|---|---|---|---|---|---|
| 1 | . | WEB-AP | Service_Switch | 20 | 1001000 | . | /home/AP | ... |
| 2 | . | . | . | . | . | . | . | . |
| 3 | . | . | . | . | . | . | . | . |
| 4 | . | . | . | . | . | . | . | . |
| . | . | . | . | . | . | . | . | . |
| . | . | . | . | . | . | . | . | . |

*FIG. 16*

AIOS Service I/O Data Format Table

| Service | Seq | Msg_ID | Field | Length | Index Key1 | Index Key2 | Input Format | Output Format | ... |
|---|---|---|---|---|---|---|---|---|---|
| Service A | 1 | Msg 001 | ... | ... | ... | ... | ... | ... | ..... |
| | 2 | Msg 002 | ... | ... | ... | ... | ... | ... | ... |
| | 3 | . | . | . | . | . | . | . | ... |
| | . | . | . | . | . | . | . | . | . |
| | . | . | . | . | . | . | . | . | . |
| | . | . | . | . | . | . | . | . | . |
| | . | . | . | . | . | . | . | . | . |
| Service B | . | . | . | . | . | . | . | . | . |

FIG. 17

A I O S Service Table

| Seq | System Nme | Service_Nme | Session | I/O Addres | ...... | Program Path | ...... | I/O 格式 |
|---|---|---|---|---|---|---|---|---|
| 1 | WEB_AP | Service_Switch | 20 | 1001000 | | | | |
| 2 | WEB_AP | Service_Gateway | 15 | 1002000 | | | | |
| 3 | WEB_AP | Service_Com | 20 | 1003000 | | | | |
| 4 | WEB_AP | Format Change | 20 | 1004000 | | | | |
| 5 | WEB_AP | Data_Check | 20 | 1005000 | | | | |
| 6 | WEB_AP | User_Check | 20 | 1006000 | | | | |
| . | CTl_AP | . | . | . | . | . | . | . |
| . | ...... | ...... | . | . | . | . | . | . |

FIG.22

| Seq | System Nme | Service Nme | Session | I/O Address | ...... | Program Path | ...... | I/O Format |
|---|---|---|---|---|---|---|---|---|
| | | | A I O S Service Setup Table | | | | | |
| 1 | WEB_AP | Service Switch | 100 | 1001000 | | | | |

FIG.24 (A)

| Seq | System Nme | ... | Service Nme | Session | I/O Address | ... | Program Path | I/O format | ... | Communication protocol |
|---|---|---|---|---|---|---|---|---|---|---|
| 2 | WEB_AP | ..... | Service Gateway | 15 | 1002000 | ..... | | | ..... | TCP/IP SNA |

FIG.25(A)

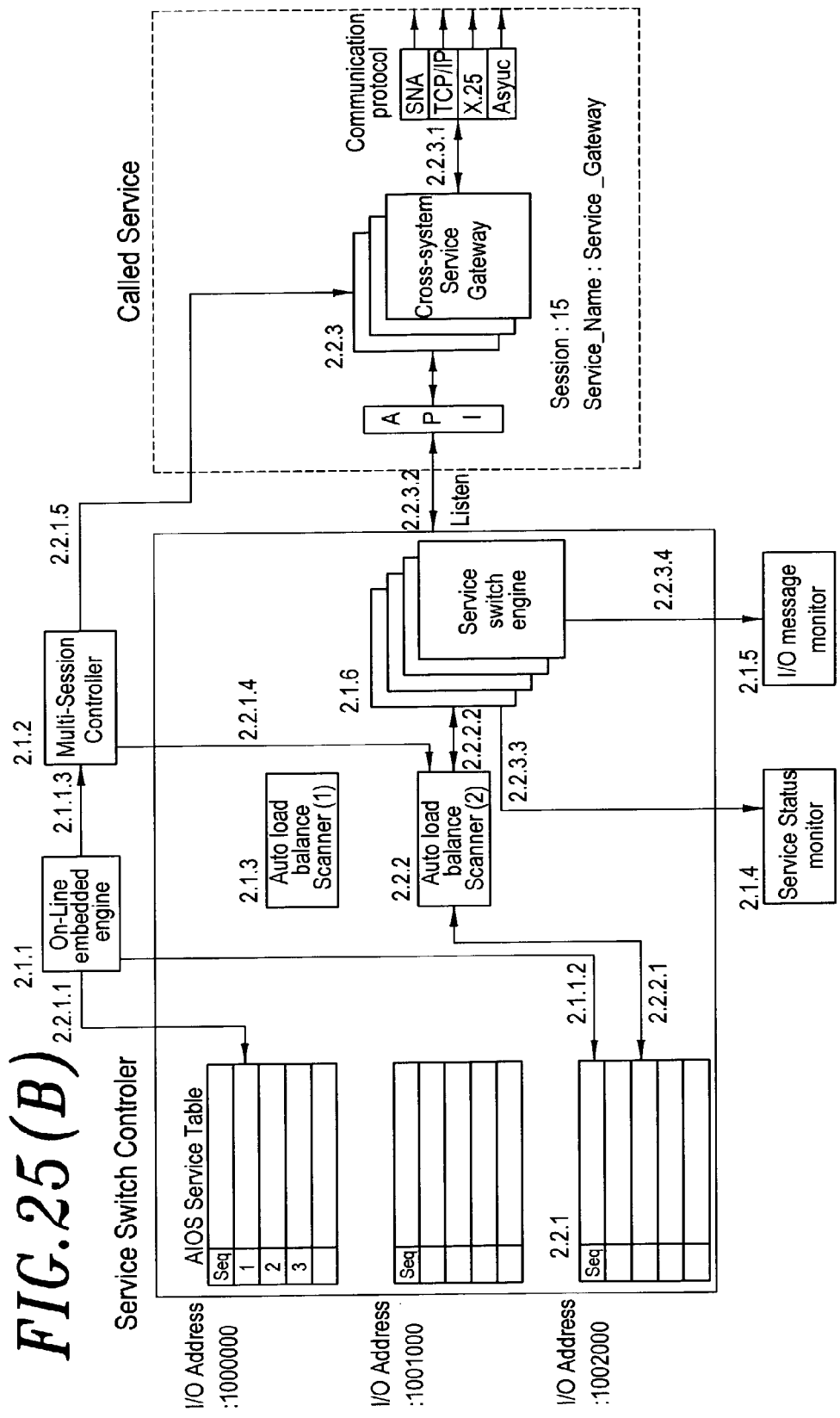

| Seq | System Nme | ... | Service Nme | Session | I/O Address | ... | Program Path | I/O format | ... | Communication protocol |
|---|---|---|---|---|---|---|---|---|---|---|
| 3 | WEB_AP | ... | Service_Com | 20 | 1003000 | | | | ... | ...... |

*FIG. 26 (A)*

APPLICATION INFA OPERATING SYSTEM

BACKGROUND OF THE INVENTION

1. Field of the Invention

The present invention relates to an application infa operating system, and more particular to an application infa operating system which considers the developing language of a new and an old and a problem of a compatible integration of a new and an old system via a manager-oriented consideration for reducing an exchanging risk.

2. Description of the Prior Art

The development of the computer software technology is originally expected to solve the problems which will be met by the user during the computerization process of the enterprise for many years through a novel developing technology, language, and tool, for example:

1. How to effectively shorten the developing time of the application system?
2. How to save the developing cost of the application system?
3. How to solve the demand of the human resources?
4. How to reduce the cost for maintaining the system?
5. How to solve the future expansion of the system?
6. How to improve the performing efficiency of the system?
7. How to simplify the system management? . . . etc.

However, till now, after the replacements of new and old software developing technologies, languages and tools for several generations, the developing technology of the software doesn't seem to effectively solve the problem met by the user. Especially, when the software developing technology is exchanged during the new and old generations, the user seems always to repeat the developing process of the application system which has the same suffering. Furthermore, the development of the software technology is mostly oriented by the technique and is expected to solve the met problem during the development of the application system through a newer technique and a newer developing tool.

Furthermore, the technology, langue and tool of a new software attempt to apply a more progressive method to solve the existed problem in the old application system. But, no one can guarantee that the practice of the new system absolutely can solve the problem met by the user perfectly.

Identically, the developments of all new systems have to come over long-winded steps of: system estimation→system planning→system analysis→ . . . →system practice. However, it does not guarantee that the user can sit back and relax after the practice of the new system. This situation opposite to the effort of the user seems not fair.

It is unavoidable to have a generation replacement of the software developing technology, but it does not mean that the old application system is nothing. Identically, the present new system might be a burden for the future new system development.

Thus it can bee seen, the prior art described above still has some defects, is not a good design, however, and is urgently to be improved.

Because of the technical defects of described above, the applicant keeps on carving unflaggingly to develop the application infa operating system through wholehearted experience and research.

SUMMARY OF THE INVENTION

The purpose of the AIOS according to the present invention hopes to utilize different points of view and a manager-oriented logic intellect to solve the problems which will be met when developing the application system through a microprocessing technology. The present invention is mainly designed for:

1. Increasing a compatibility of the application system;
2. Improving an integration ability of the application system;
3. Simplifying the application system operating;
4. Standardizing the service Input/Output (I/O) of the application system;
5. Reconstructing the resource of the application system; and
6. Standardizing the system management.

So as to satisfy the needs of:

1. Reducing the time of developing the application;
2. Saving the cost of developing the application system;
3. Continuously using the manpower already owned;
4. Reducing the cost of maintaining the application system;
5. Satisfying the future expansion of the application system;
6. Improving the performing efficiency of the application system; and
7. Simplifying the management and operation of the application system . . . etc.

The AIOS (Application Infa Operating System, AIOS) of the present invention owns some functions as follows:

1. The improved compatibility of the application system—the present invention utilizes a manager-oriented concept to consider the compatibility and integration of new and old developing languages and tools for reducing the exchanging risk of new and old systems. In the viewpoint of management, no matter any language and tool is used, it should be used to solve problems and should not bring new persecution. In the other words, no matter using which language of C, C++, Cobal, DataBase, or Java to develop the application system, the technology problem of exchanging new and old application systems should not be the persecution and suffering shouldered by the user. Therefore, it hopes to develop a system for integrating different languages and tools, so that the user can exempt from the suffering and risk of overall exchange. As shown in FIG. 1, the exchange of old and new systems is partial and circular and not overall refresh of the system, so that this can reduce the risk and suffering faced by the user during refreshing the whole system.

2. The improved integration ability of the application system—the complete practice of the application system is usually not completed by only one person. Therefore, it is extremely possible an achievement together developed by many people or many companies. It is hard to produce a perfect cooperation and team when it owns different engineerings having different technology and background, or different information companies with different cultures, especially when facing the competition. However, for the user, no matter the system is developed by what kind of company or which engineering, the system is better to be an independent individual which will not be interfered by each other and can be controlled and monitored by the user. Consequently, we look forward to has a system which can manager and integrate the service or system developed from different background, different companies and different engineerings, as shown in FIG. 2.

3. The simplified operating of the application system—in the concept of designing the present invention, no matter developing the new application system or maintaining the old system, the service system developed from different software developing technologies used by different companies and different engineerings at different backgrounds should be integrated in accordance with the standard Input/Output (I/O) interface defined by the user. In the other words, the managing, maintaining and integrating of the application system can be standardized and can be controlled and managed by the user corresponding to the standard defined by the demand of the user. Through the standardization of the managing, maintaining and integrating, it will be benefit to the future expansion of the system and to the user to more easily operate the application system.

4. Standardized Input/Output service of the application system—in the concept of designing the AIOS in the present invention, the I/O data format of all the embedded and registered systems or services must be qualified by the standard set by the user, and this imperceptibly increases the re-use rate of the system service. Namely, the I/O data format of all services is the standard made under the monitoring of the user, that means a system service developed from an A company under the standard and used for many years can be referenced by a B company few years later, as shown in FIG. 3. Actually, this situation can save the cost paid by the user for developing new system, and the user also can exempt from repetitiously investing the service modules having identical functions.

5. Re-made resource of the application system—in the concept of designing the AIOS in the present invention, the service developed from the standard just like a standard component which should be continuously used without limitation. Namely, no matter the service is developed from which language and tool at what time, as long as it conforms to the user's need, it should be referential under future system expansion. Take the service "Cobol" developed several years age as an example, as long as it's service is conformed to the demand of the system, it should also be referential to C, C++, Java or DataBase, and another module having identical function will not need to be developed. However, the prerequisite is that the user has to know the I/O data format of the service "Cobol".

6. Standard interfaced Input/Output data format of the application system and service—it is a difficult job to manage, maintain, exchange and integrate the application system. In the viewpoint of the manager, the manager should not worry about the application system and service which are developed no matter by which engineering in which company at what time and no matter by which software developing language and tool. And, it even should not own source code because the manager can not realize every kind of things. Even though, when the manager is changed or after the transition for several generations, it is afraid that no one will remember the original design concept and developing language and tool in the old system. In the concept of the AIOS according to the present invention, it provides a set of manager tables for all application systems and services and I/O data formats for standardizing the management of the system and then interfacing the standard. Namely, for the manager, it only needs to know if the function of the module still conforms to the demand, and what is the I/O data format. As to the module is developed by which company, which engineering, and which developing language and tool, these should not be worried by us. The present invention hopes that each system service and module can like a hardware interface card which can be embedded, removed and refreshed at any time. And, the user only needs to know if this interface card is suitable and needn't to know how the interface card is designed. As to the unsuitable interface card, it should be removed and exchanged casually without influencing other interface cards. This will make the managing, integrating, maintaining and refreshing to become more easily. For the manager, it only needs to maintain one standard interface, as shown in FIG. 4.

BRIEF DESCRIPTION OF THE DRAWINGS

The drawings disclose an illustrative embodiment of the present invention which serves to exemplify the various advantages and objects hereof, and are as follows:

FIG. 16 shows a column schematic view of Service Table according to the present invention;

FIG. 17 shows a column schematic view of Service I/O Data Format Table according to the present invention;

FIG. 22 shows an AIOS Service Table according to the present invention;

FIGS. 24(A)~(B) show schematic views of the service switch controller according to the present invention;

FIGS. 25(A)~(B) show schematic views of the cross-system service gateway according to the present invention;

FIGS. 26(A)~(B) show initiating flow chart of the input receiver according to the present invention;

DETAILED DESCRIPTION OF THE PREFERRED EMBODIMENT

Figure 1:
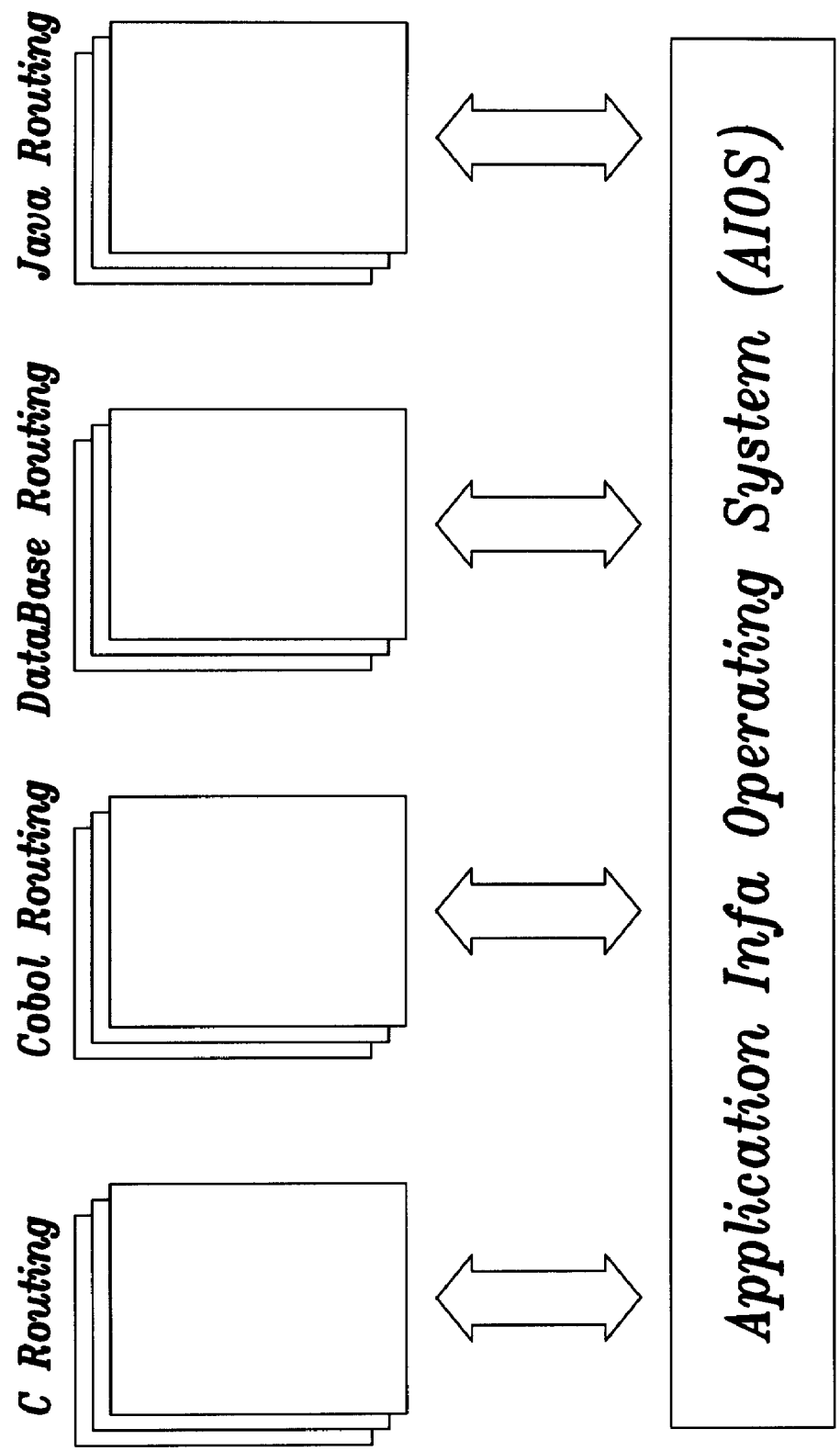
FIG. 1 shows the practical architecture for increasing the compatibility of the application system according to the present invention.
Figure 2:
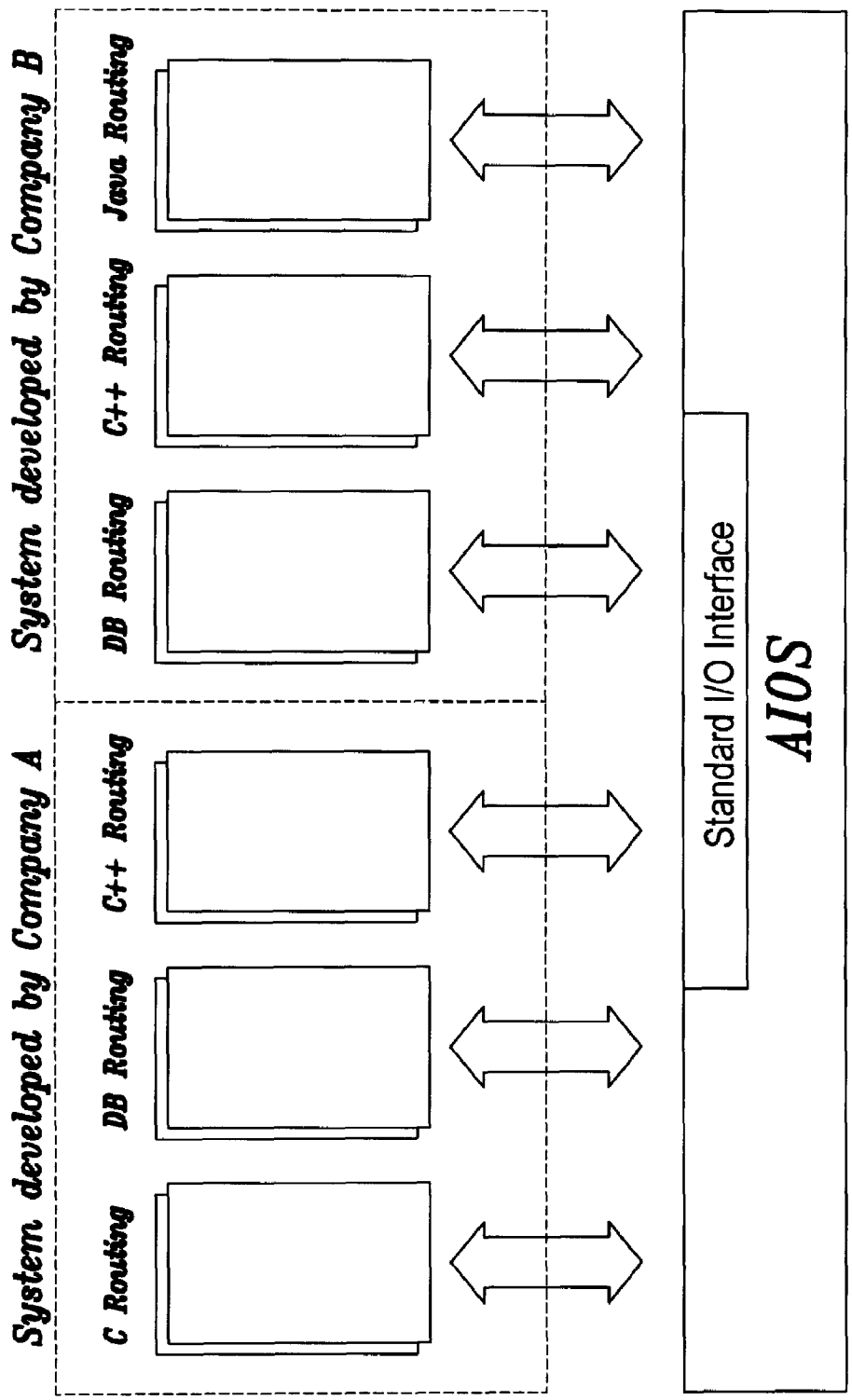
FIG. 2 shows the practical architecture for improving the integration ability of the application system according to the present invention.
Figure 3:
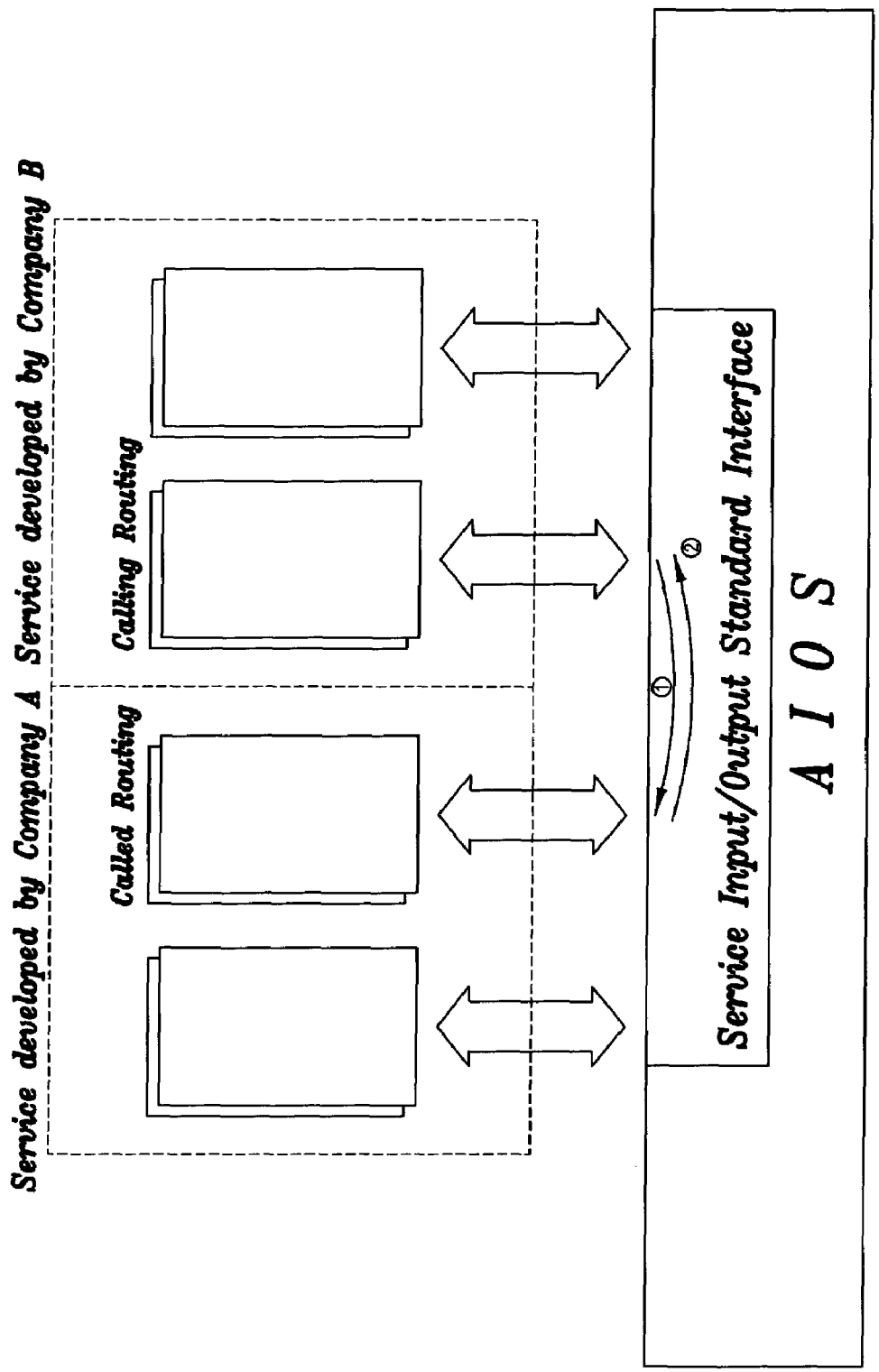
FIG. 3 shows the practical architecture for standardizing the service I/O (Input/Output) of the application system according to the present invention.
Figure 4:
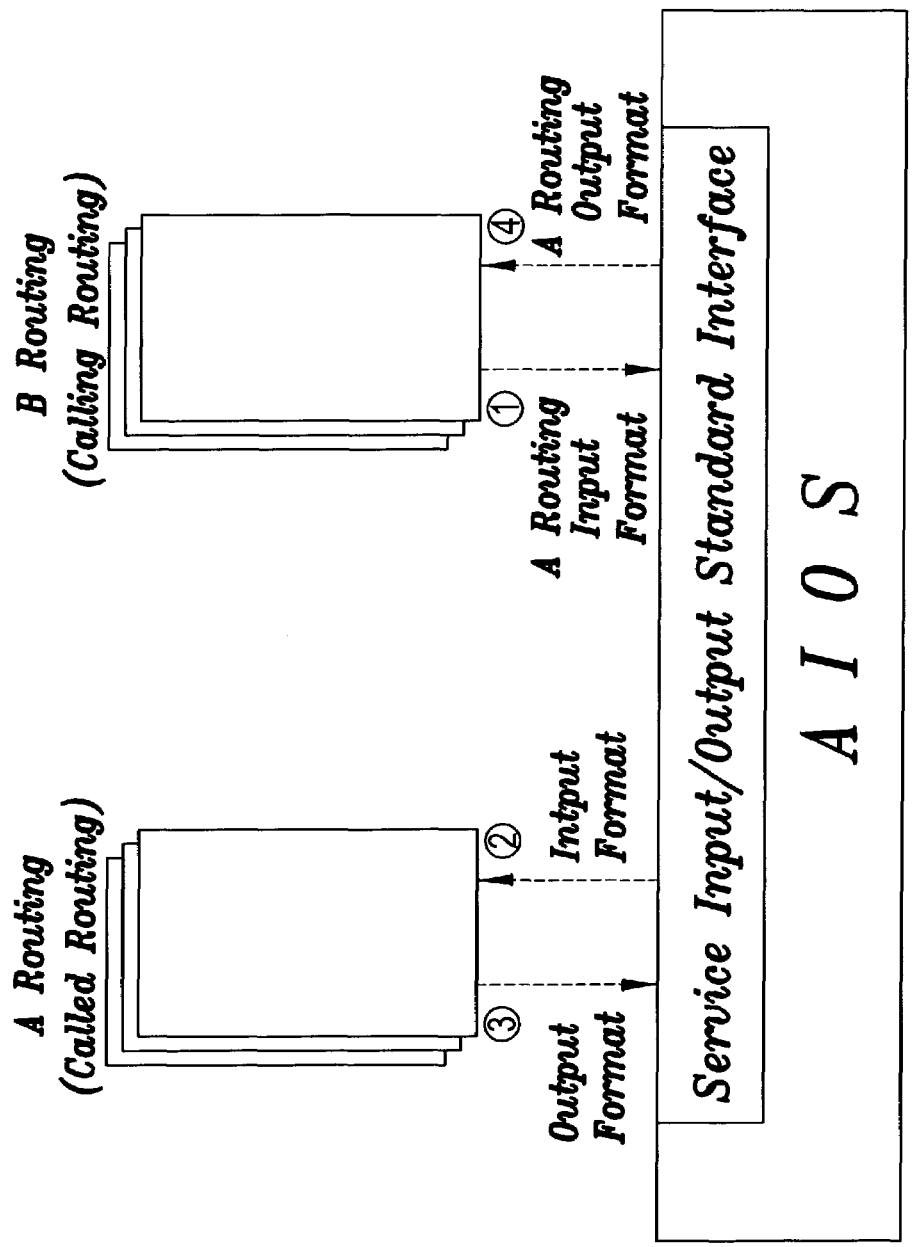
FIG. 4 shows the practical architecture of standard interfacing of the application system and the service I/O data format according to the present invention.
Figure 5:
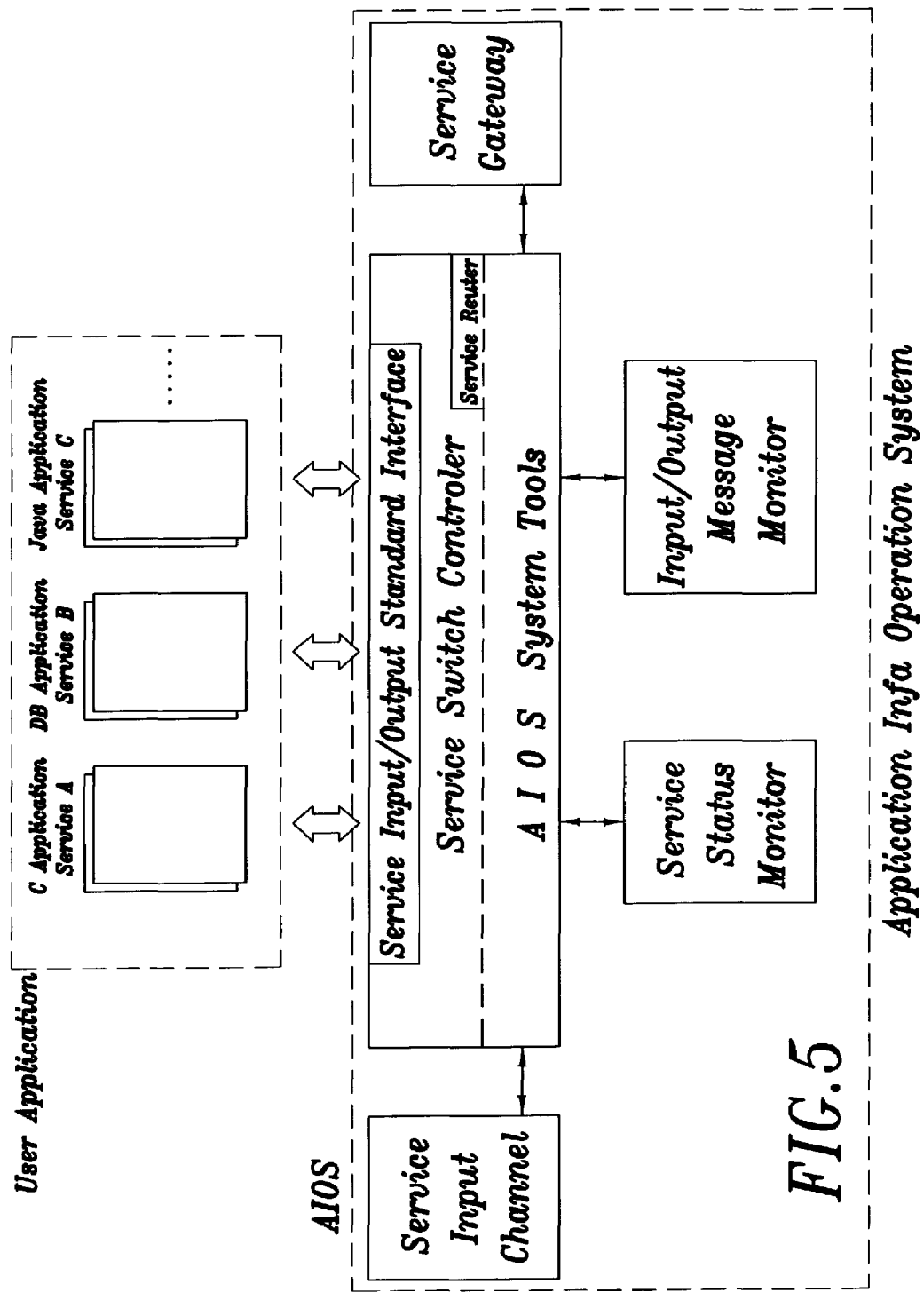
FIG. 5 shows the practical architecture of the application infa operating system according to the present invention.

The present invention provides an operating system for managing, integrating and maintaining an application system module and service. The main purpose thereof is to employ a manager-oriented concept to integrate different processes with different functions which are developed from different technologies of different companies and different program designers and to achieve an overall monitoring of the operation of the application system for benefiting the application system to adjust the performing efficiency. The system architecture of the present invention is illustrated in FIG. 5. The present invention is mainly developed in an open compatible operating system, such as Unix, Zenix, Linux, and Microsoft Window.

The purpose of the design in the present invention, except integrating different system processes, is also to provide a perfect managing circumstance which comprises service developing, integrating, debugging, initiating, performing, monitoring, efficiency estimating, system exchanging, and data backup, and the user can easily complete the management and control through a graphic man machine interface (MMI).

The present invention adopts different design concepts and a manager-oriented consideration as a prototype to derive a designed logic for design. The main architecture comprises:

1. Concurrent Application Process

Figure 6:
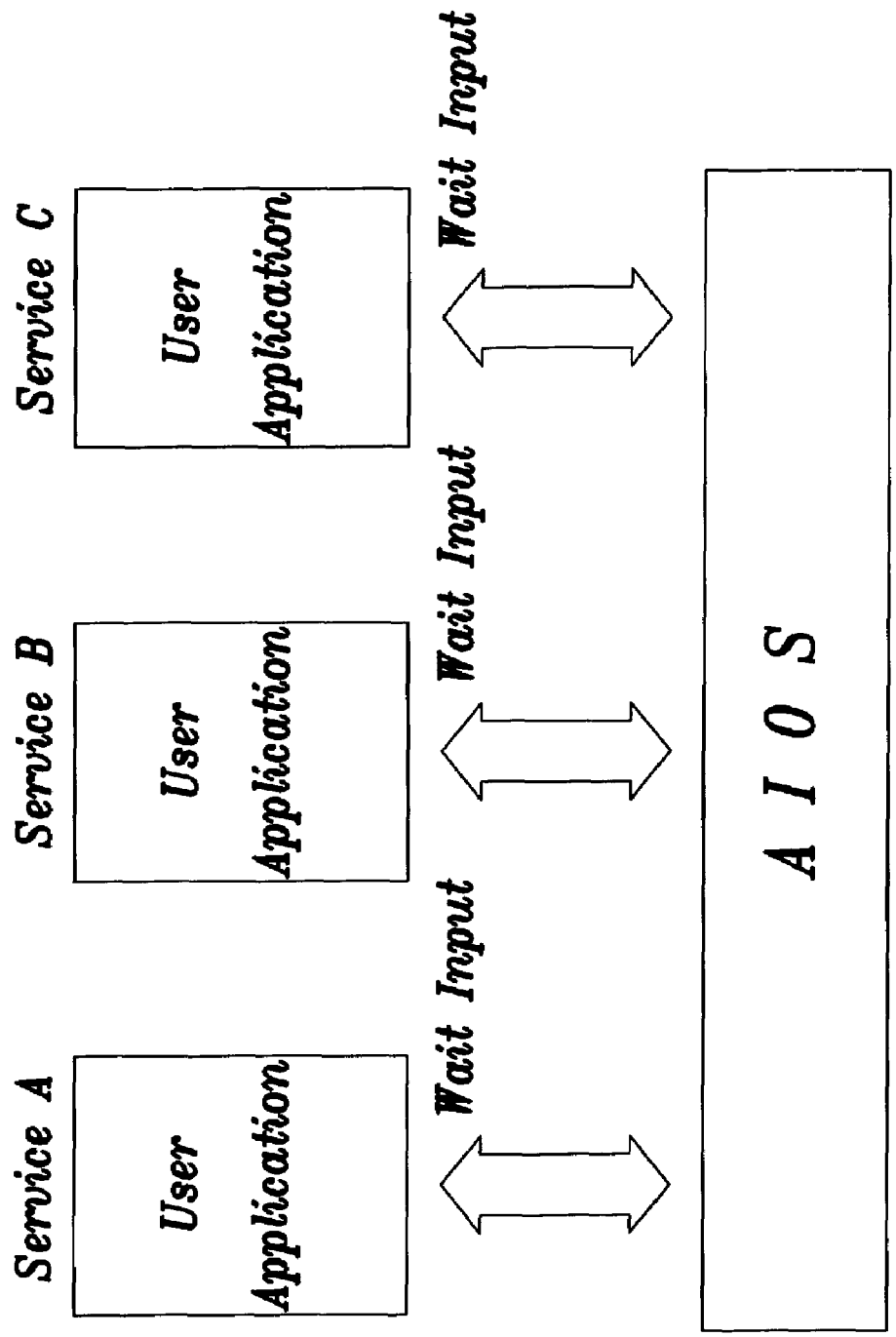
FIG. 6 shows the practical architecture of concurrent in the application service according to the present invention.
Figure 7:
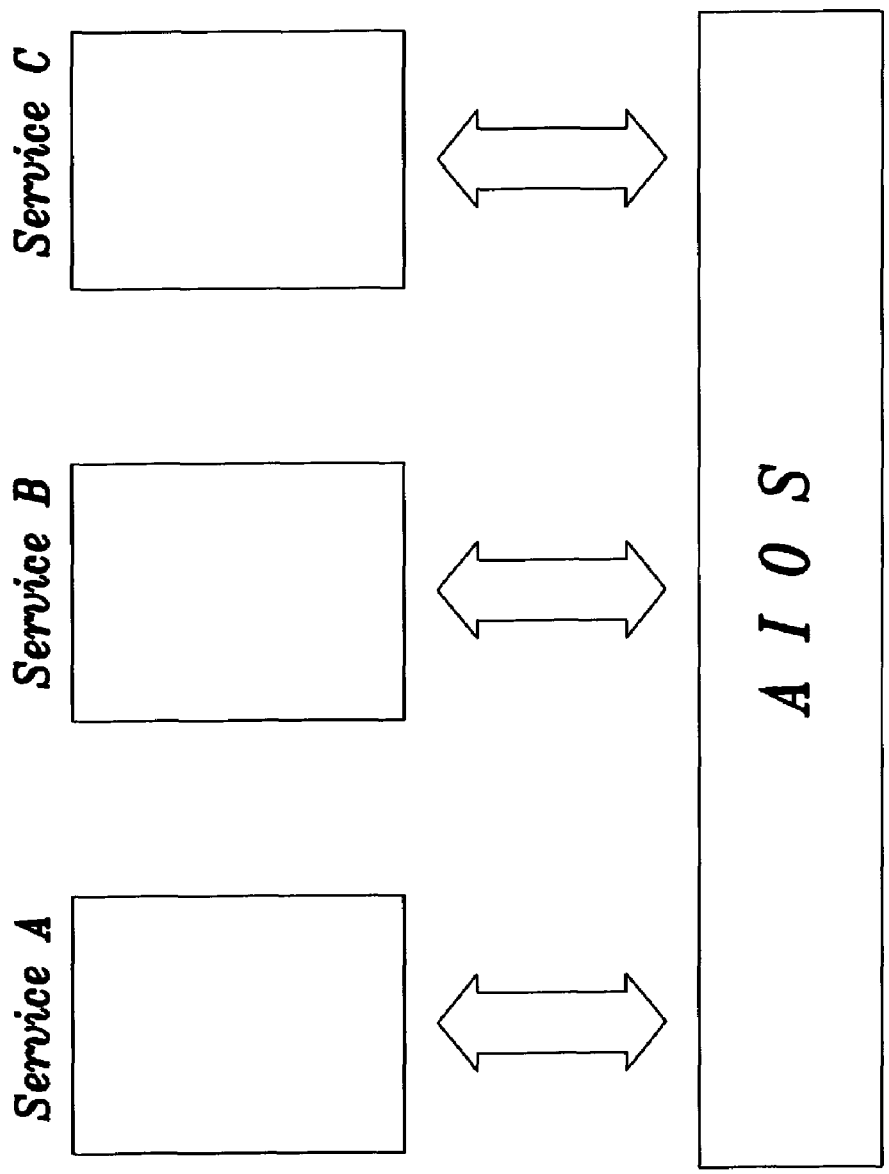
FIG. 7 shows a reciprocal architecture of a service to service process according to the present invention.

As shown in FIG. 6, the present invention provides an API (Application Program Interface) embedded in AIOS. No matter what kind of developing language and tool used by the program designer, the program designer without training can easily embed an application program designed by himself into AIOS for being a service process therein to wait for input and can also use other embedded service processes in AIOS. Concurrent designed logic makes each service process embedded in AIOS to be a reciprocal service process therein without a differentiation between main and secondary programs. Thus, the re-use rate of the process can be improved and all service processes are relative but not interfere with each other. Namely, the user can easily remove and exchange an unsuitable service process without altering other service processes.

2. Reciprocal Architecture of Service to Service Process

Regarding to the data exchange and communication between the service processes, the present invention adopts an architecture similar to the Client/Server architecture but provides more powerful functions than that. Any process which is embedded in AIOS, namely a service component in AIOS, can not only be a server but also be a client module. The program designer only needs to call the AIOS embedded API provided by the present invention, and it will easily be a service process in this system for mutually calling, communicating and exchanging data with any other service process in the system through the API provided by the present invention, and the program designer even doesn't need to know any design logic of the present invention.

3. API Embedded in AIOS

Figure 8:
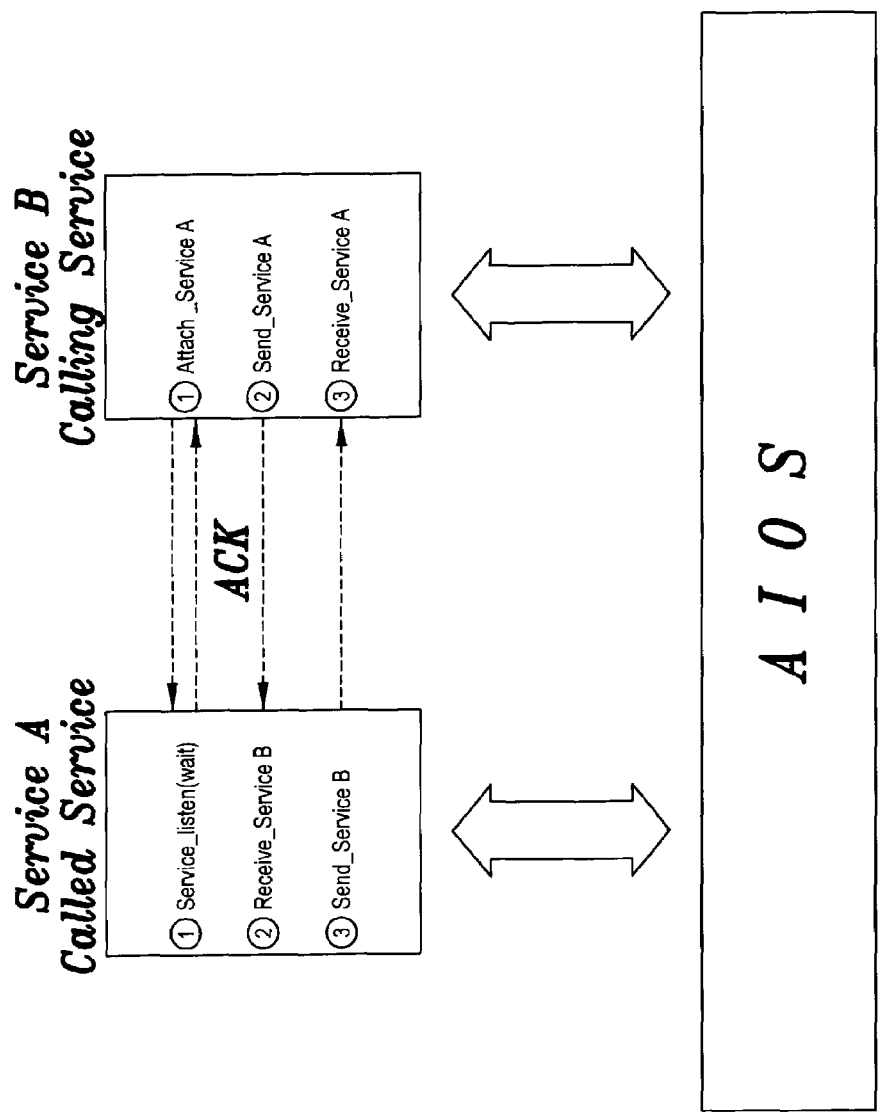
FIG. 8 shows a practical architecture of a calling service and a called service according to the present invention.

The present invention provides two set of embedded APIs (calling service and called service), as shown in FIG. 8.

Figure 9:
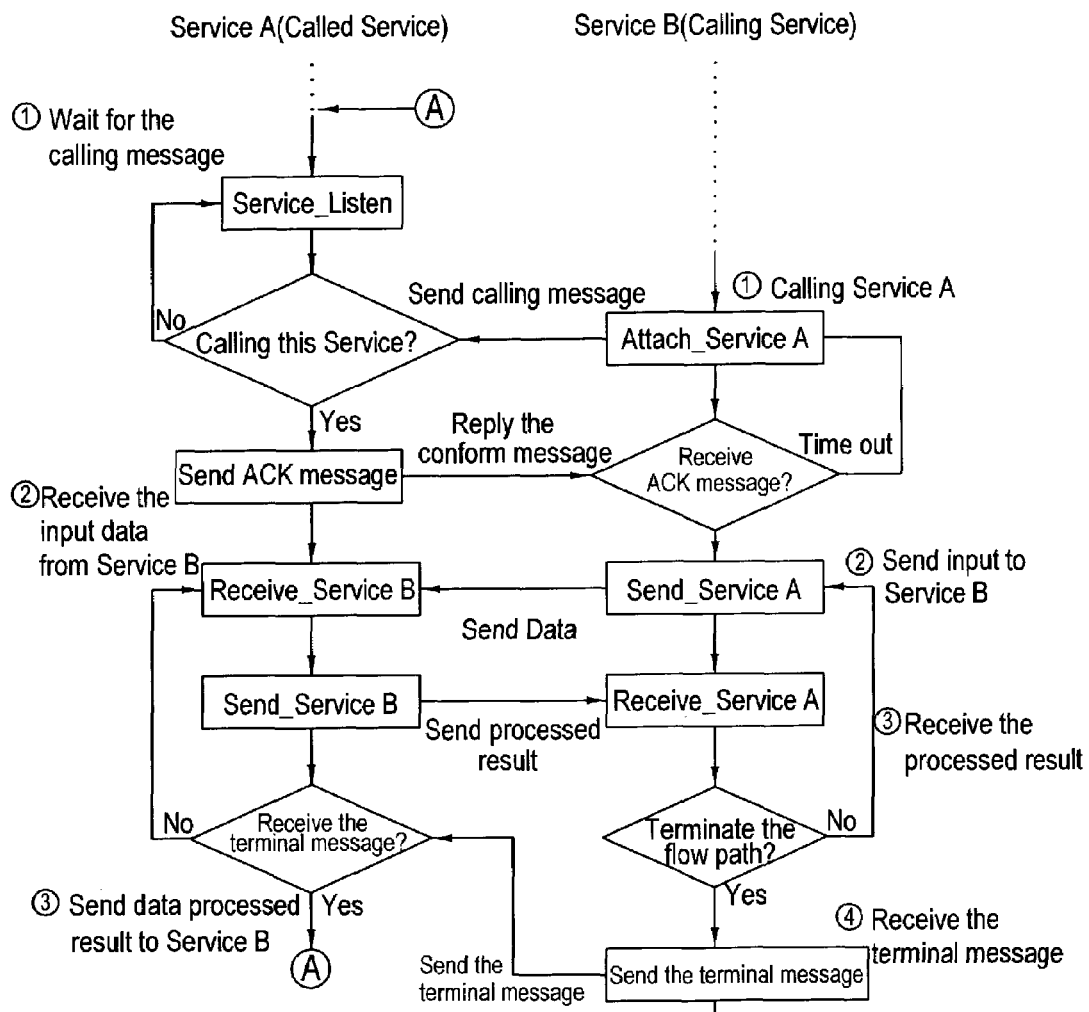
FIG. 9 shows a flow chart of the processes of four APIs (Service_listen, Attath_Service, Receive_Service, Send_Service)

Moreover, the present invention provides four service flow paths (Service_listen, Attach_service, Receive_Servide, and Send_service) of API, as shown in FIG. 9. No matter the calling service or the called service, it only needs three APIs to complete the processes of data exchanging and communicating between different service processes. In fact, in the calling service and the called service, Receive_Service and Send_Service are identical API, and the only difference is the different service_Name. Namely, for reducing the burden of the program designer to acknowledge the present invention, the present invention simplify the complex program conversation flow path to be four APIs (Service_listen, Attach_Service, Receive_Servide, and Send_Service), and thus the program designer can embed the program in AIOS with almost no burden.

4. Calling Service and Called Service

Figure 10:
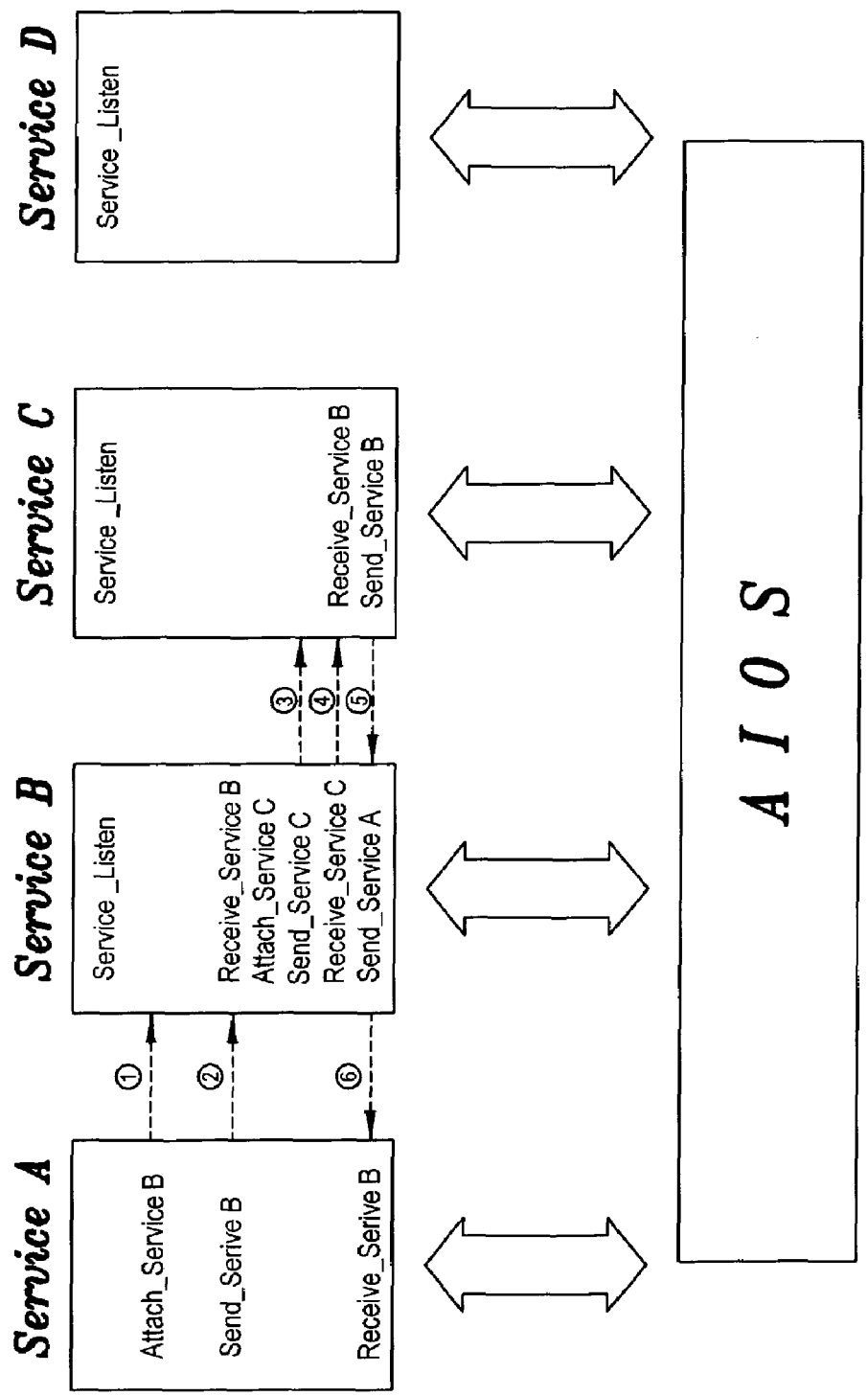
FIG. 10 shows a practical architecture of a calling service and a called service in another embodiment according to the present invention.

Another flexible design of the present invention can permit the embedded program to be a calling service and also to be a called service. Namely, when the called service receives a service calling, it can transform to the calling service to call other service processes, as shown in FIG. 10.

5. Distributing Process and Concurrent Process

Figure 11:
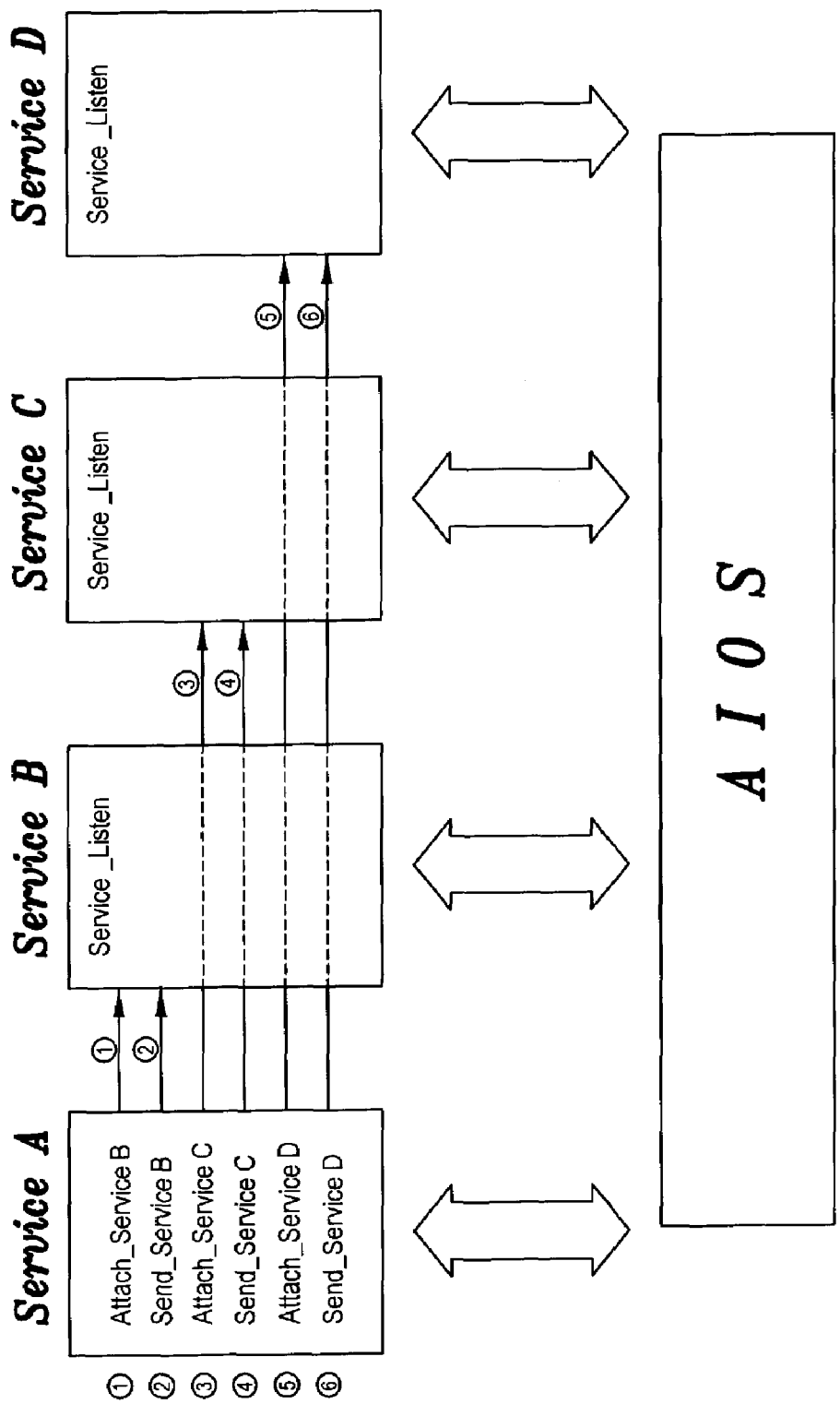
FIG. 11 shows a practical architecture of the conversation module of a synchronous and an asynchronous services according to the present invention.

The present invention provides a synchronous and an asynchronous conversation modules. In other words, when the calling service calls a called service, at the same time, the calling service can call another called service without waiting. Namely, one calling service can call plural called services simultaneously to request called services. As shown in FIG. 11, Service A can simultaneously send plural inputs to different services for being processed and doesn't need to wait for the first data to be processed completely for further sending the second data. This design can distribute the loadings of Service A to Service B, Service C and Service D for being processed, and because Service B, Service C and Service D are concurrently initiated to process data, the data processing speed can be accelerated.

6. Multi-Session-Service

Figure 12:
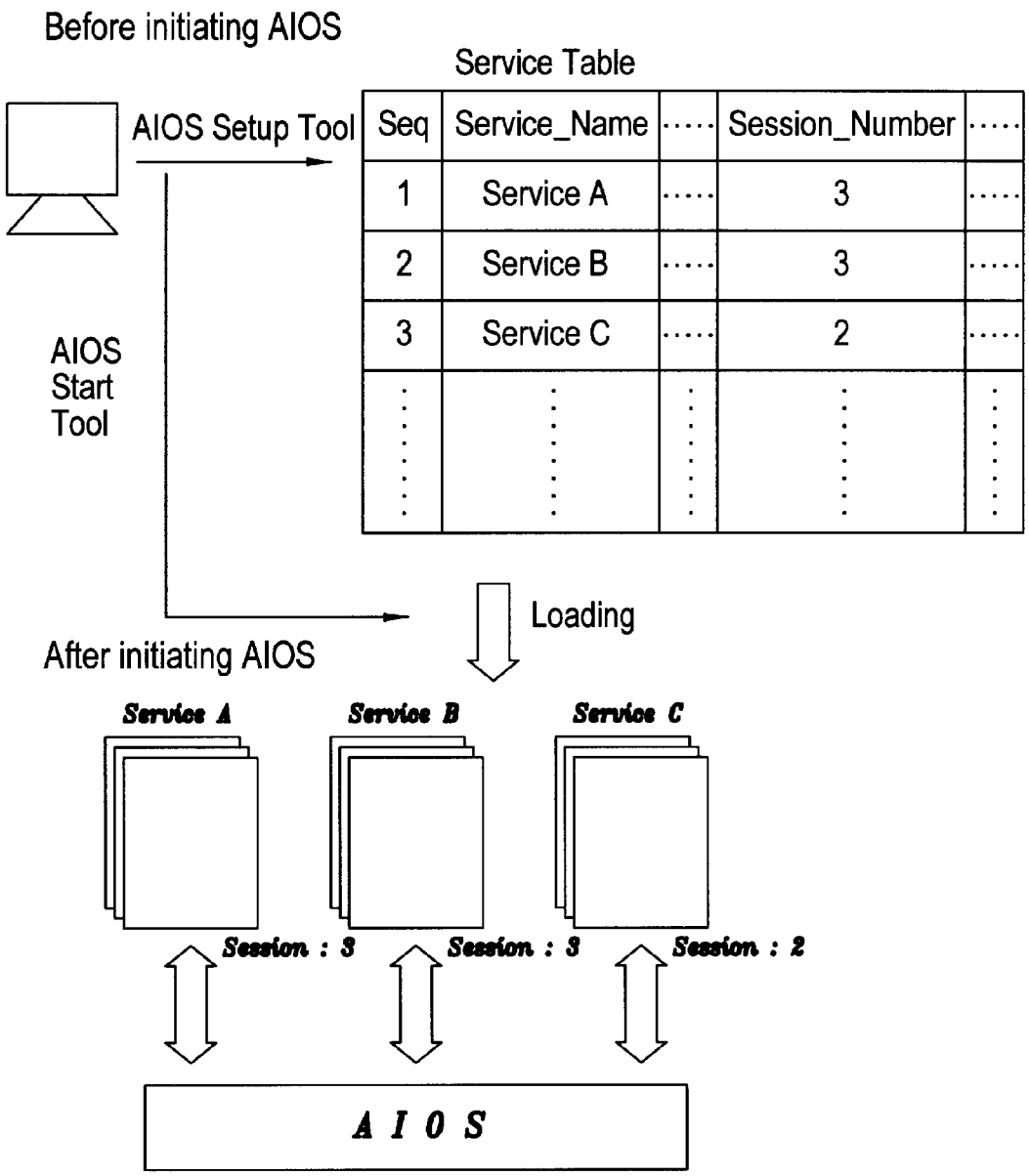
FIG. 12 shows a practical architecture of a multi-session-service according to the present invention.

For reducing the loading of the program designer, the present invention separately provides a function of multi-session-service. The program designer doesn't need to recognize the detail of the program on the multi-session-service and only needs to setup the number of the services needed to be initiated in Service Table provided by AIOS before initiating AIOS, as shown in FIG. 12.

7. Recursion Calling and Cross Calling

Figure 13:
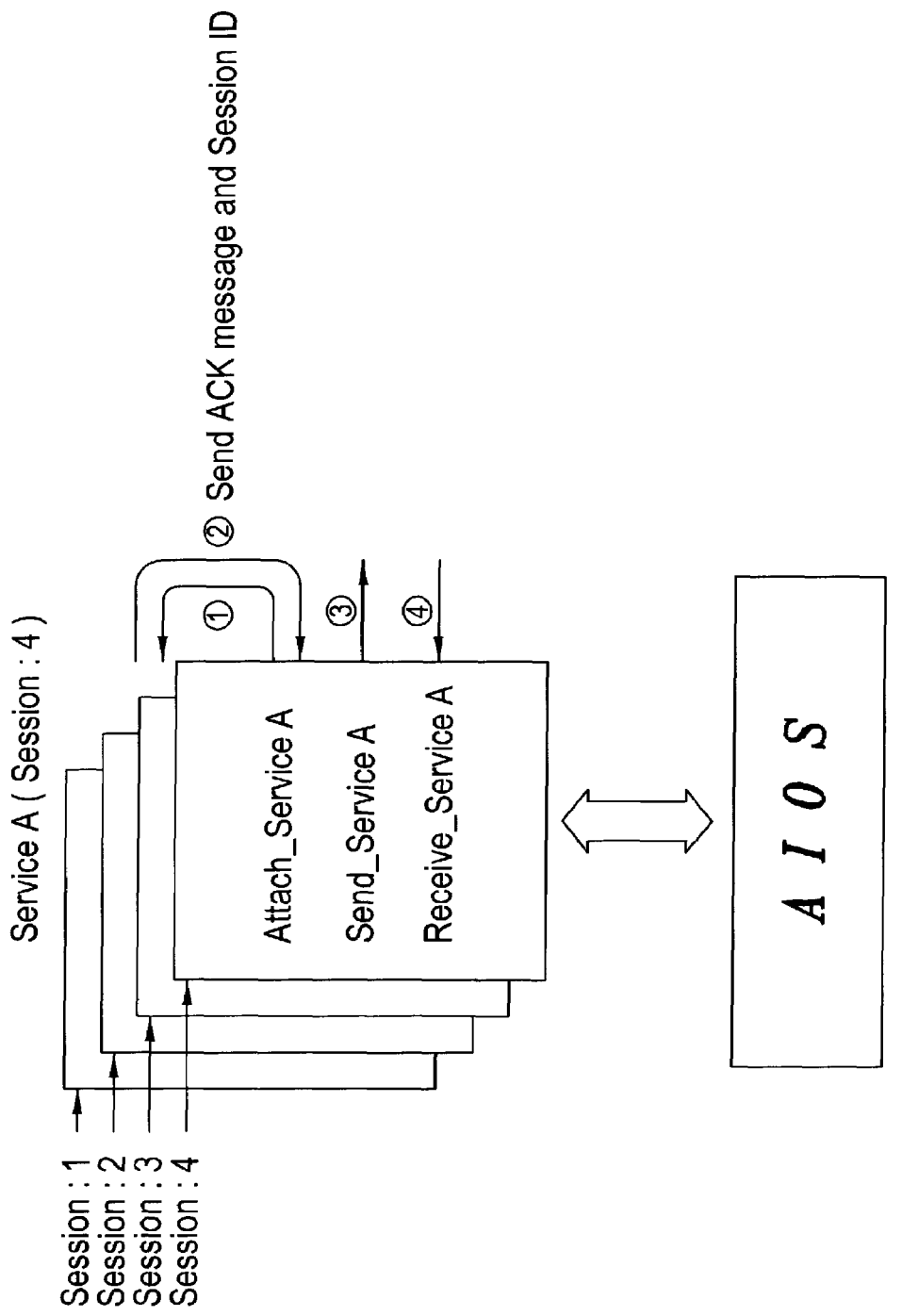
FIG. 13 shows a practical architecture of a recursion calling according to the present invention.
Figure 14:
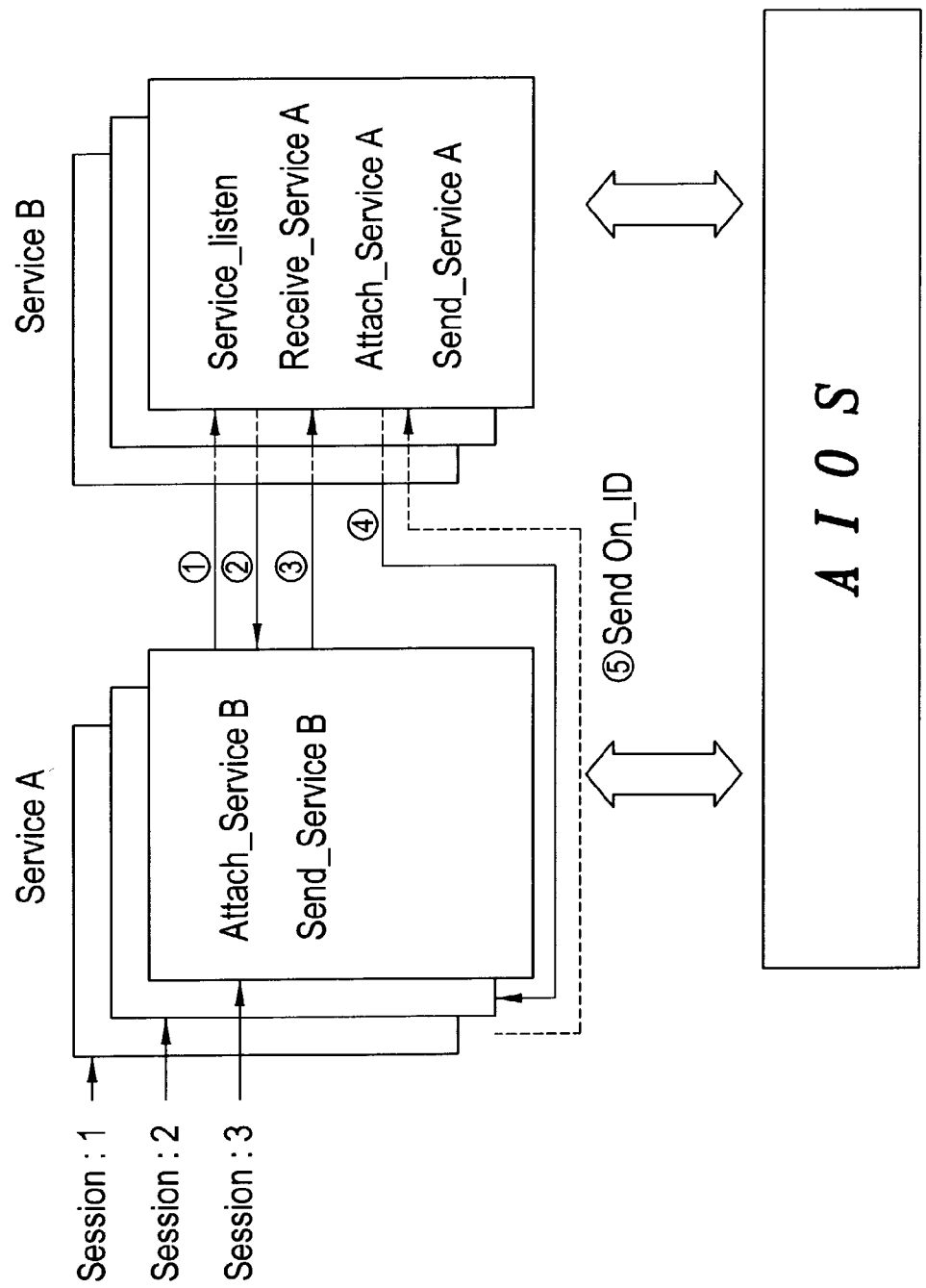
FIG. 14 shows a practical architecture of a cross calling according to the present invention.

The present invention, except providing a function of multi-session-service, also permits a called service to re-call a calling service. However, the program designer has to pay attention to judge the program logic for avoiding a circuit. As shown in FIGS. 13 and 14, FIG. 13 is a recursion calling and FIG. 14 is a cross calling. The cross calling means that after Session: 3 of Service B sends the data, AIOS permits Session: 3 of Service B to re-call another Session of Service A corresponding to the demand.

8. Service-Session Auto Load Balance

Figure 15:
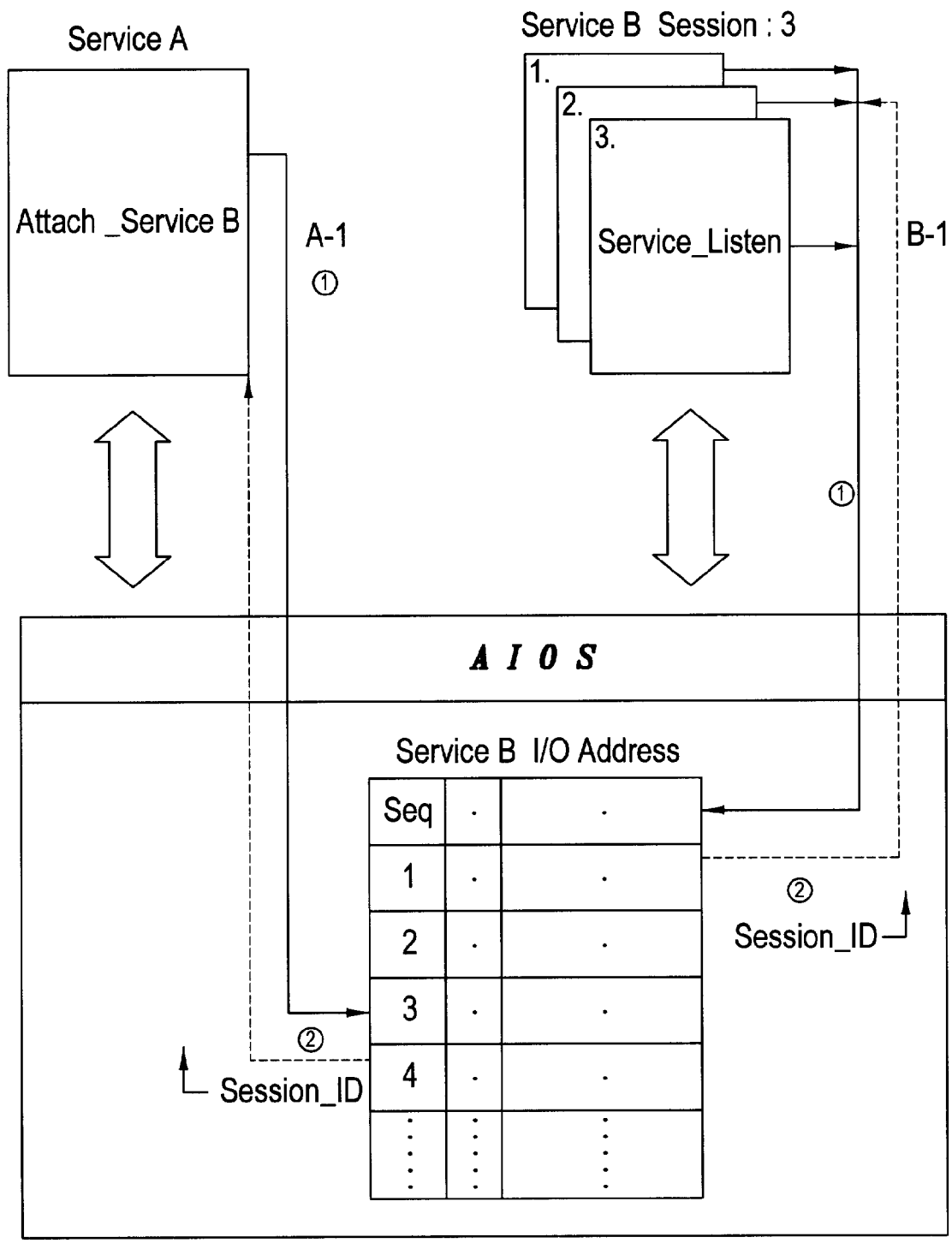
FIG. 15 shows a practical architecture of the present invention for supporting a multi-session-service buffer and auto load balance.

The present invention, except providing a multi-session-service, also supports a multi-session-service buffer and auto load balance, as shown in FIG. 15.

Please refer to FIG. 15, step A-1: when Service A calls Attach_Service B, AIOS will find I/O Address and I/O Buffer of Service B according to Service Table, look for and record a free address, and alter the status flag. When the status flag is altered by Service B, all statuses will be calculated to obtain a Session_ID which will then be transmitted to Service A and Service B. Service A and Service B can take Session_ID as an I/O data identification code.

Please refer to FIG. 15, step B-1: when Service B calls Service_listen, AIOS will scan I/O Address of Service B to know that is there any input. And, when plural Service B simultaneously call Service_listen, AIOS will record all left services, and when an input is inputted, AIOS will automatically inform the left Service B and transmit a Session_ID to the appointed Session of Service B.

AIOS can look for the opposite left service corresponding to the left service table and request the left service to receive and process the data and form the functions of left service-session auto load balance and service performance load balance so as to improve the performing efficiency of the service which is not a general dispatch load balance.

9. Interfacing of Service Managing, Maintaining, Exchanging and Integrating in Application System The maintaining, management, exchange and integration of the application system are difficult and suffering jobs. An application service and system which is tested or executed for years may not need to be maintained. For a manager, it only needs to consider if the service conforms to the demand right now, and it will not need to modify the original program.

The present invention is an embedded application system, and thus it is not suggested to the user to maintain or modify the original service. In the concept of the present invention, each service process embedded in AIOS is basically a fundamental component in the system. Regarding to the component which does not conform to the demand, the user can select to (1) delete old component and replace new one, or (2) embed a processing component for conforming the demand without modifying the old component which will make the maintaining, managing, exchange and integration of the application system easier.

The present invention provides two service managing tables described as follows for assisting the user to manage and maintain the application system and process:

(1) Service Table, as shown in FIG. 16; and (2) Service I/O Data Format Table, as shown in FIG. 17.

Figure 18:
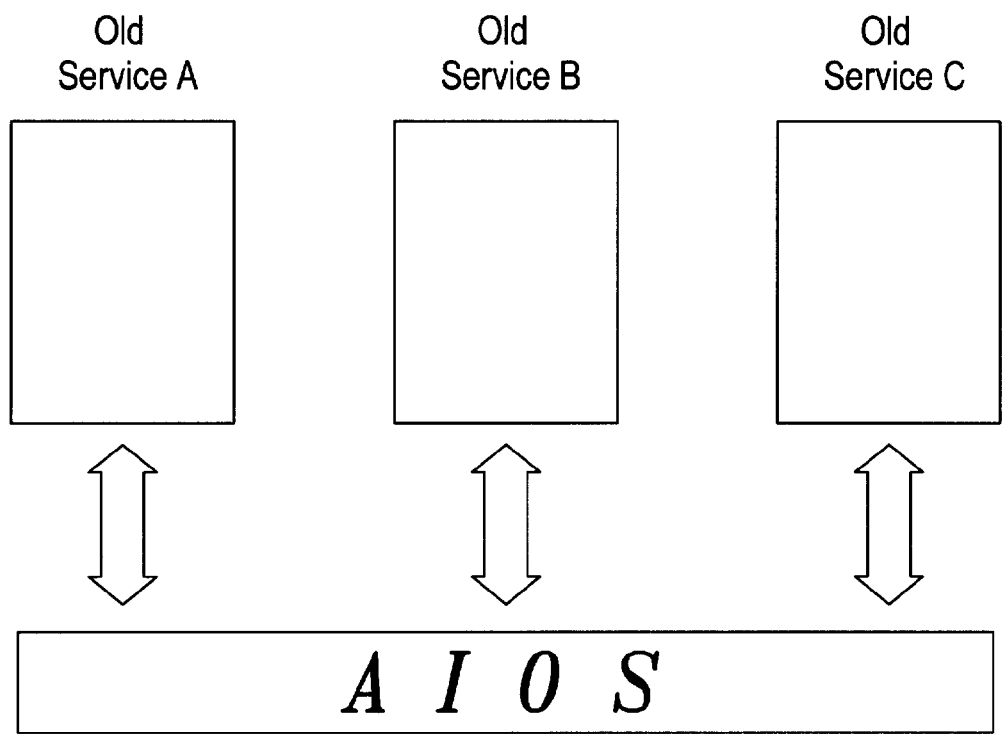
FIG. 18 shows a practically schematic view of the present invention when proceeding a process of removing old components and replacing new components before adjusting.
Figure 19:
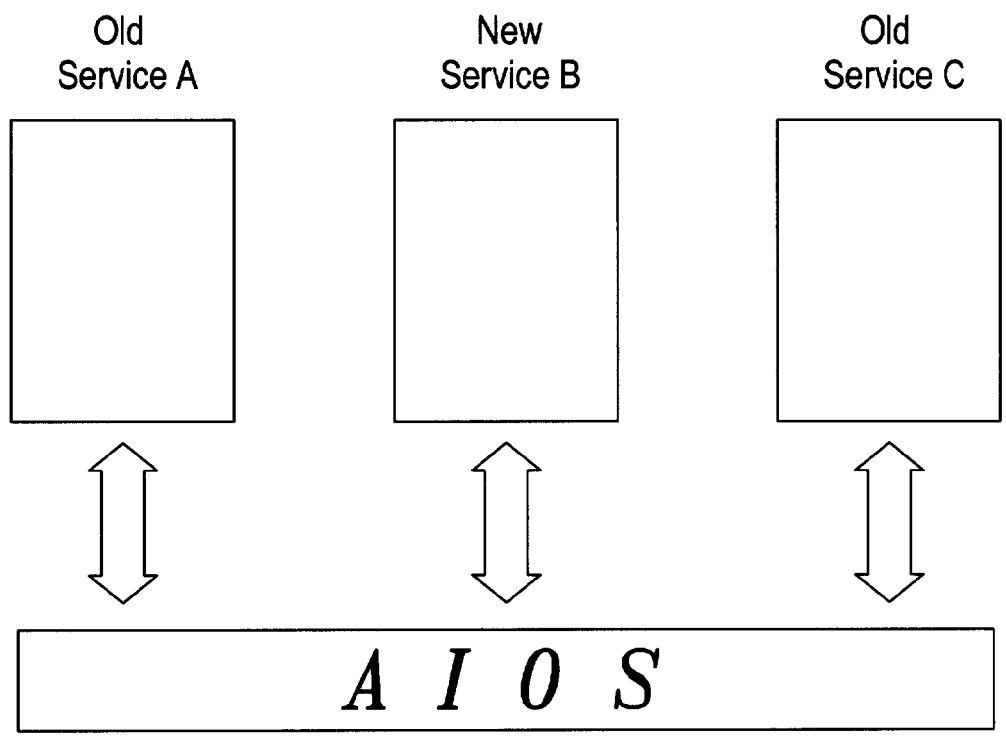
FIG. 19 shows a practically schematic view of the present invention when proceeding a process of removing old components and replacing new components after adjusting.
Figure 20:
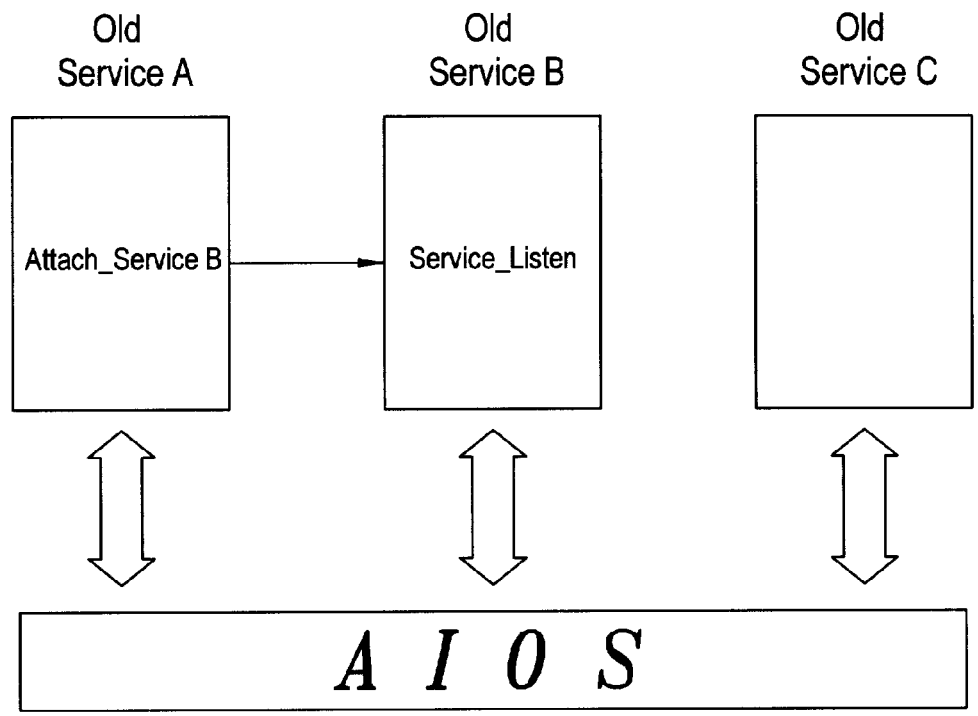
FIG. 20 shows a practically schematic view of the present invention when embedding a processing component before adjusting.
Figure 21:
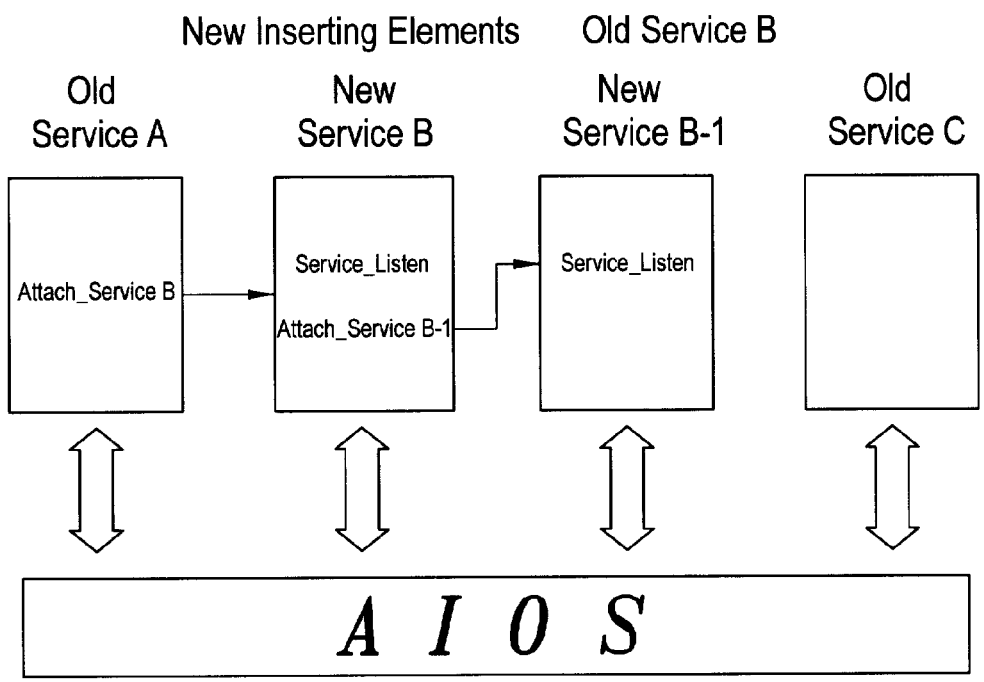
FIG. 21 shows a practically schematic view of the present invention when embedding a processing component after adjusting.

The exchange and integration method of AIOS according to the present invention includes steps of:

(1) Deleting old component and replacing new one—please refer to FIG. 18 which shows the result before adjusting (it wants to delete Service B and embed a new Service B) and FIG. 19 which shows the result after adjusting. For the modifying module of deleting old component and replacing new one, the user only needs to put the newly written Service B to the program path appointed by the user and modify the program path column of Service B in Service Table into the program path of the new component, and the process of deleting old component and replacing new one will be completed without influencing other components; and (2) Embedding a processing component—please refer to FIG. 20 which shows the result before adjusting (it wants to embed New Service B for modifying the function of the old Service B) and FIG. 21 which shows the result after adjusting.

The AIOS of the present invention provides two service managing tools, so that the user can setup the I/O format and the relative arguments of all services through the graphic managing interface. This makes the maintaining, managing, exchanging and integrating of the application system to become freer and easier, and the user can simply control all application systems and services and modify data processing flow path.

10. System Operating Integration

The present invention provides a graphic interface for system managing. The system setup, service development, debugging, integration, testing, system initiating and performing, embedded service monitoring, I/O message monitoring, system resource monitoring, performing efficiency adjusting, service stop, system stop, and data backup can all be completed by the user through the interface of system manager tool.

The setup, initiation and performance of AIOS according to the present invention The present invention is designed to provide a setup table having a graphic interface, so that the user can easily setup the property and character and initiate system of each service-program through the table.

1.1 Application Infa Operation System (AIOS)

AIOS Service Table is shown in FIG. 22.

1.2 Initiation and performance of the system

The initiation of the present invention can be separated into two parts and the present invention also provides an automatically initiating tool.

The initiation and performance of the fundamental system

The fundamental system includes an on-line service embedding controller, a multi-session-service controller, plural data buffers and auto load balance scanners, an I/O message switch engine, a service status monitor, an I/O message monitor, a cross-system service gateway, and a service input channel.

Figure 23:
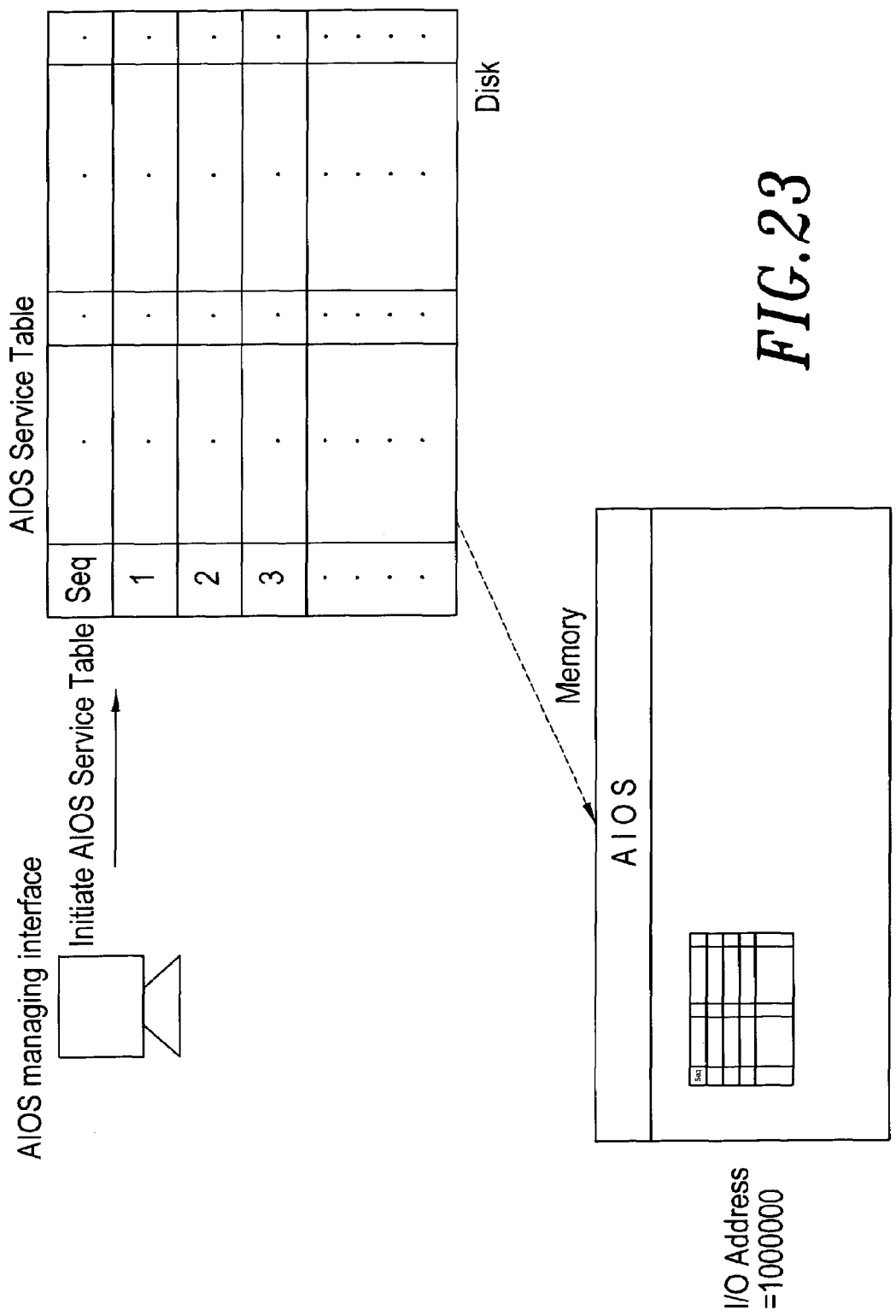
FIG. 23 shows a practically schematic view of initiating according to the present invention.

2. Initiation of AIOS, as shown in FIG. 23.

Figure 24B:
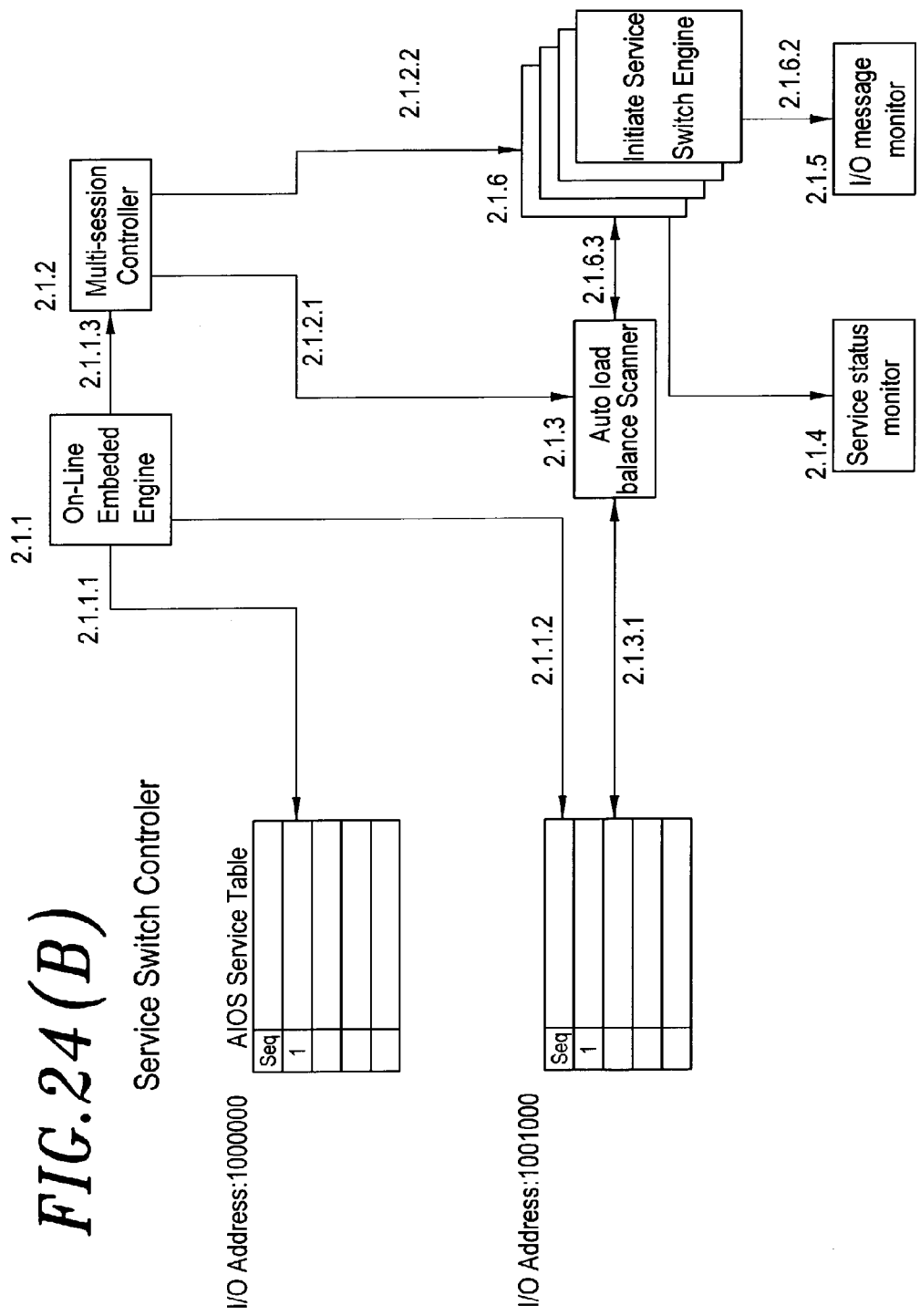

2.1 Initiate Service Switch Controller, as shown in FIGS. 24(A)~(B).

2.1.1 Initiate On-iine Service Embedding.

2.1.2 Initiate Multi-Session-Service Controller.

2.1.3 Initiate I/O Buffer Scanner & Auto Load Balance Engine.

2.1.4 Initiate Service Status Monitor.

2.1.5 Initiate I/O Message Monitor.

2.1.6 Initiate Service Switch Engine, Session: 100 Session.

2.1.1.1 Read the arguments set in the first column (Service Switch Controller) of AIOS Service Table.

2.1.1.2 Produce Service Switch I/O Data Buffer (I/O Address: 1001000).

2.1.1.3 Transmit Service Name, Service Path, Service Number, Service Status Monitor Address and I/O Data Monitor Address to Multi-Session Controller Engine.

2.1.2.1 Auto Load Balance Scanner is initiated by Multi-Session Controller to scan input data in I/O Data Buffer (I/O Address: 1001000) corresponding to the input transmitted therein.

2.1.2.2 Service Switch is initiated by Multi-Session Controller corresponding to the process session of the arguments which aare transmitted therein.

2.1.3.1 The input data is scanned by Auto Load Balance Scanner corresponding to I/O Address of Data Buffer.

2.1.6.1 All initiated Service Switch Processes: 10 Session are previously connected to the Service Status Monitor and transmit a real time status to the service Status Monitor for refreshing the service status.

2.1.6.2 All initiated Service Switch Processes are connected to the I/O Data Monitor and transmit the received data format and the processed data format to the I/O Data Monitor for refreshing the result and status of data processing.

2.1.6.3 All initiated Service Switch Processes are connected to the Auto Load Balance Scanner (Service_listen) for waiting for the input, and once the input shows (I/O Address: 1001000), the Auto Load Balance Scanner will send a request message to the Service Switch Process for calling services and also transmit the I/O Address of the input data to the Service Switch Process.

2.2 Initiate Cross-System Service Gateway, as shown in FIGS. 25(A)~(B).

2.2.1 Produce Service Gateway I/O Data Buffer.

2.2.2 Initiate Auto Load Balance Scanner (2).

2.2.3 Initiated Cross-System Service Gateway.

2.2.1.1 Real time Service embedding reads relative setups of the Cross-System Service Gateway from the second column of AIOS Service Table and initiates the gateway.

2.2.1.2 Produce I/O Data Buffer (I/O Address: 1002000) of Cross-System Service Gateway.

2.2.1.3 Transmit relative argument of Cross-System Service Gateway to Multi-Session-Service.

2.2.1.4 Auto Load Balance Scanner (2) is initiated by Multi-Session-Service for scanning the input in I/O Data Buffer (I/O Address: 1002000).

2.2.1.5 Cross-System Service Gateway provided by the present invention is initiated by Multi-session service (the system provides communication protocols, such as TCP/IP, SNA, X.25, Asyuc etc.) corresponding on the relative argument of the Cross-System Service Gateway transmitted therein to connect to the service out of the system for achieving cross-system distribute processing.

2.2.2.1 Scan is proceeded by Auto load balance scanner (2) corresponding on Data Buffer Address (I/O Address: 1002000) for looking for inputs.

2.2.2.2 Auto load balance scanner (2) scans the input, sends a request of calling service to the Service Switch Process and transmits the input (I/O Address) to the Service Switch Process.

2.2.3.1 Cross-system Service Gateway makes a connection to the service on other host corresponding to the argument of the communication protocol set by the user.

2.2.3.2 Gateway makes a connection to the Service Switch Process through API (Service_listen).

2.2.3.3 Service Switch Process transships the online registered service data to Service Status Monitor, and when Auto Load Balance Scanner (2) sends a request message for calling service and any Service Switch Process (there are one hundred services when being initiated) receives the message, I/O Buffer Address (I/O Address: 1002000+n), sent by the scanner, the scanner will scan and look for a corresponding left service (listen_status) in Service Status Monitor, alter the status of the service as an Accept_status, simultaneously transship the input in I/O Address into I/O Message Monitor, and inform the service to receive the input. Furthermore, after the Session_ID is transmitted, Session_ID will be transmitted back to the service. And, when the service receives Session_ID, it will proceed Service_Receive, API, or Service_Send, API, which is corresponding to Session_ID.

Figure 26B:
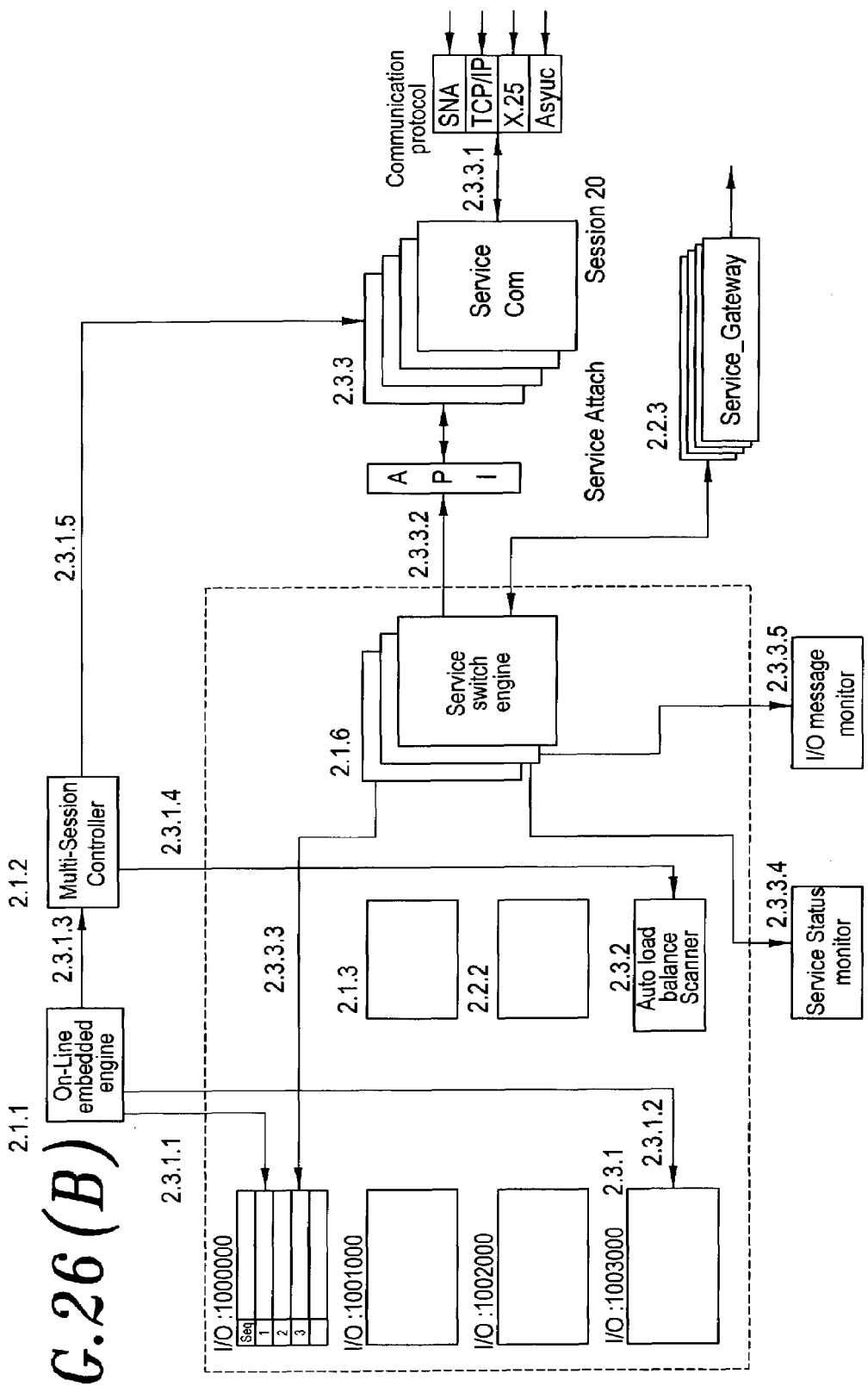

2.3 Initiate the receiving of the input, as shown in FIG. 26(A) and (B). The system service of Service_Com mainly receives the cross-system input, and the user can integrate different services, such as NT, Unix system, or input from large host, e.g., input from WEB, CTI, Call Center, through this service.

2.3.1 Produce data buffer of input receiver.

2.3.2 Produce Data Buffer Scanner.

2.3.3 Initiate Input Receiver (Service_Com).

2.3.1.1 Real time service embedding reads relative setup argument of Input Data Receiver in the third column of AIOS Service Table and initiates the gateway.

2.3.1.2 Produce Cross-System Input Receiver Data Buffer.

2.3.1.3 Transmit relative argument of Cross-System Input Receiver to Multi-Session Controller.

2.3.1.4 Multi-session controller produces Data Buffer Scanner corresponding to I/O Address: 1003000.

2.3.1.5 Multi-Session Controller produces servers of different communication protocols (the present invention provides communication protocols, such as TCP/IP, X.25, SNA, Asyno etc.) corresponding to the relative argument transmitted therein and previously produces 20 Service Sessions depending on the setup argument (Session: 20) for controlling the number of the external input and increasing the stability of the system performance.

2.3.3.1 When external input is produced, any previously built service session which is mainly in a left status will automatically fight for servicing for achieving auto performance load balance.

2.3.3.2 When the servicing right is strived by Service Session, the Service Session will call API (Service_Attach) provided by the present invention and transmit the connected Service_Name to Service_Switch_Controller.

2.3.3.3 When Service_Switch Controller received the message and Service_Name, it will look for I/O Address of Service_Name recorded in Data Buffer corresponding to the Service_Name in Service Table.

2.3.3.4 Modify the service status in Service Status Monitor as Attach_Service, and after being calculated, Session_ID and Attach_Service, API, will be transmitted back, and Attach_Service, API, will transmit Session_ID back to the main calling program. The main program can use Session_ID and Service_Switch_Controller to do Data Input (Send_Service) and Data Output (Receive_Service). Service_Com can find I/O Address of I/O Data, modify the service status through Session_ID, and exchange the data message to the called service indirectly through I/O Data Buffer Address and not directly face the Data Output of Called Service. This separated calling method for data output makes the main program to simultaneously call plural service for achieving concurrent processing.

2.3.3.5 When there exists any message exchange (Service_Send, Service_Receive), the I/O message will be transmitted to I/O Message Monitor for monitoring the message processing status.

Figure 27:
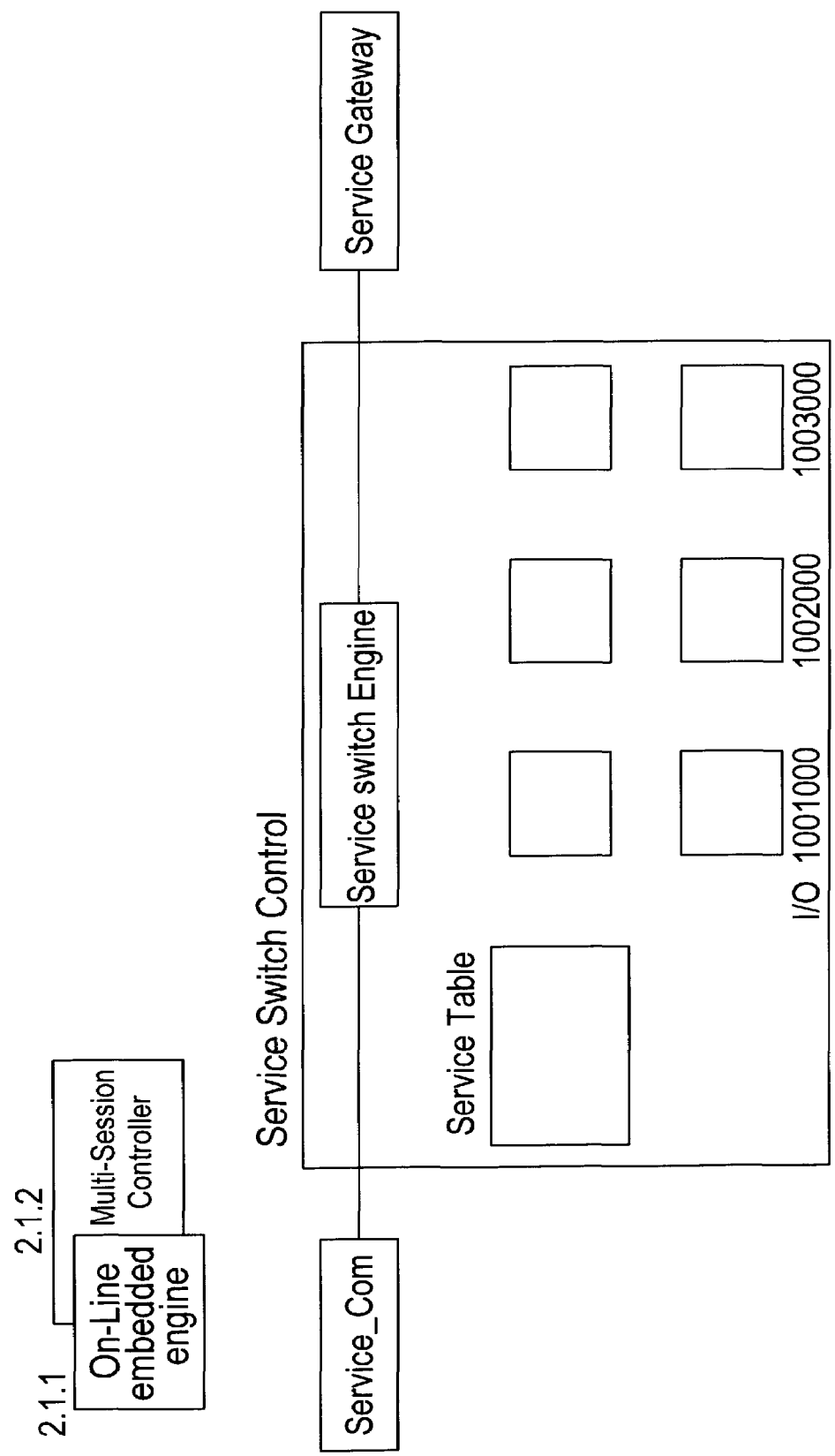
FIG. 27 shows a practically schematic view according to the present invention after initiating the fundamental system.

3. The initiation and performance of the application system and the system architecture of the fundamental system for the user is shown in FIG. 27.

The user can set the relative arguments, such as the service needed to be embedded and the number of services in Service Table corresponding to different demands and call API (Service_listen: waiting for service request, Receive_Service: receiving input message, Send_Service: responding the result of message processing) of embedded AIOS provided by the present invention when in one service. When this system according to the present invention is initiated, it will automatically execute the service which is set in Service Table by the user so as to make the service to be a called service in AIOS for waiting for being called and processing input message at any time.

Figure 28:
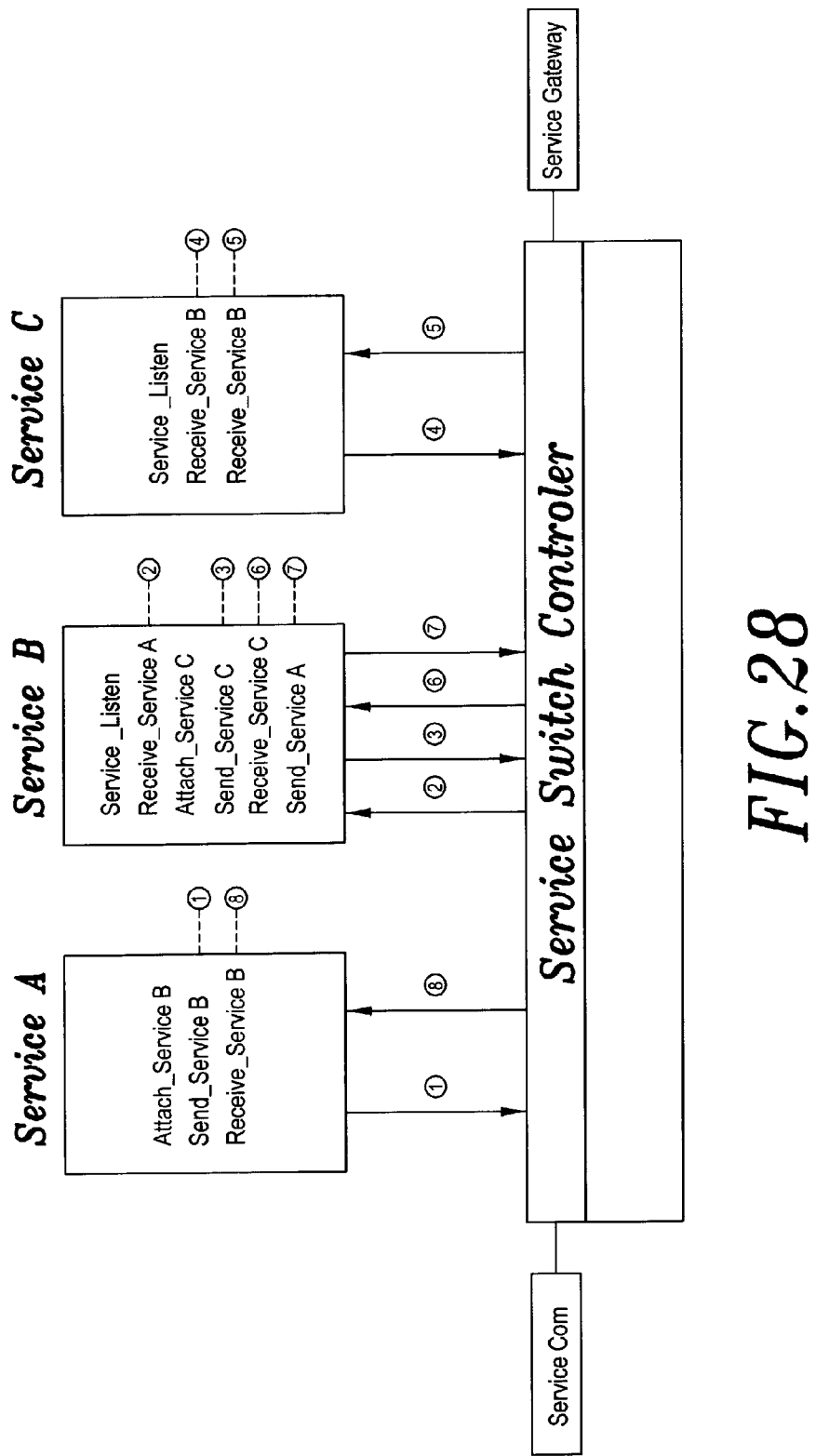
FIG. 28 shows a flow chart of the API which is the calling service and the called service according to the present invention.

Identically, the user also can call another Service XX in this system and request Service XX to service through API (Attach Service XX) provided by the present invention when in one service, utilize API (Send_Service XX) to transmit input data to Service XX and utilize API (Receive_Service XX) to recycle the processing result. This design can permit the embedded service to be a called service and also to be a calling service, as shown in FIG. 28.

No matter Called Service or Calling Service, the present invention provides identical API and the difference is the Service Name. For the user, there are only four APIs (Service_listen, Attach_Service, Receive_Service, Send_Service). Therefore, the user can easily modify the old system to embed thereof in the system according to the present invention without any training for integrating the newly developed system. And, it will not need to significantly modify the old system or re-write the old system for integrating new system. Thus, this can greatly reduce the loading of the user.

4. Service monitoring, message monitoring, and system resource monitoring

In the present invention, when the system is initiated, at the same time, Service Status Monitor and I/O Message Monitor are initiated, too. The user can check the status of all service embedded in and removed from the system and I/O Data Status of the system through Service Status Display Tool and I/O Message Display Tool provided by the operating interface in the present invention. In addition, the present invention also can integrate systems "Linux and Unix" via the operating interface to provide Resource Status Display for monitoring the present status of system resources (CPU, Memory, SWAP, Space, Process).

5. System Efficiency Adjusting and On-line Service Embedding and Removing

Figure 29:
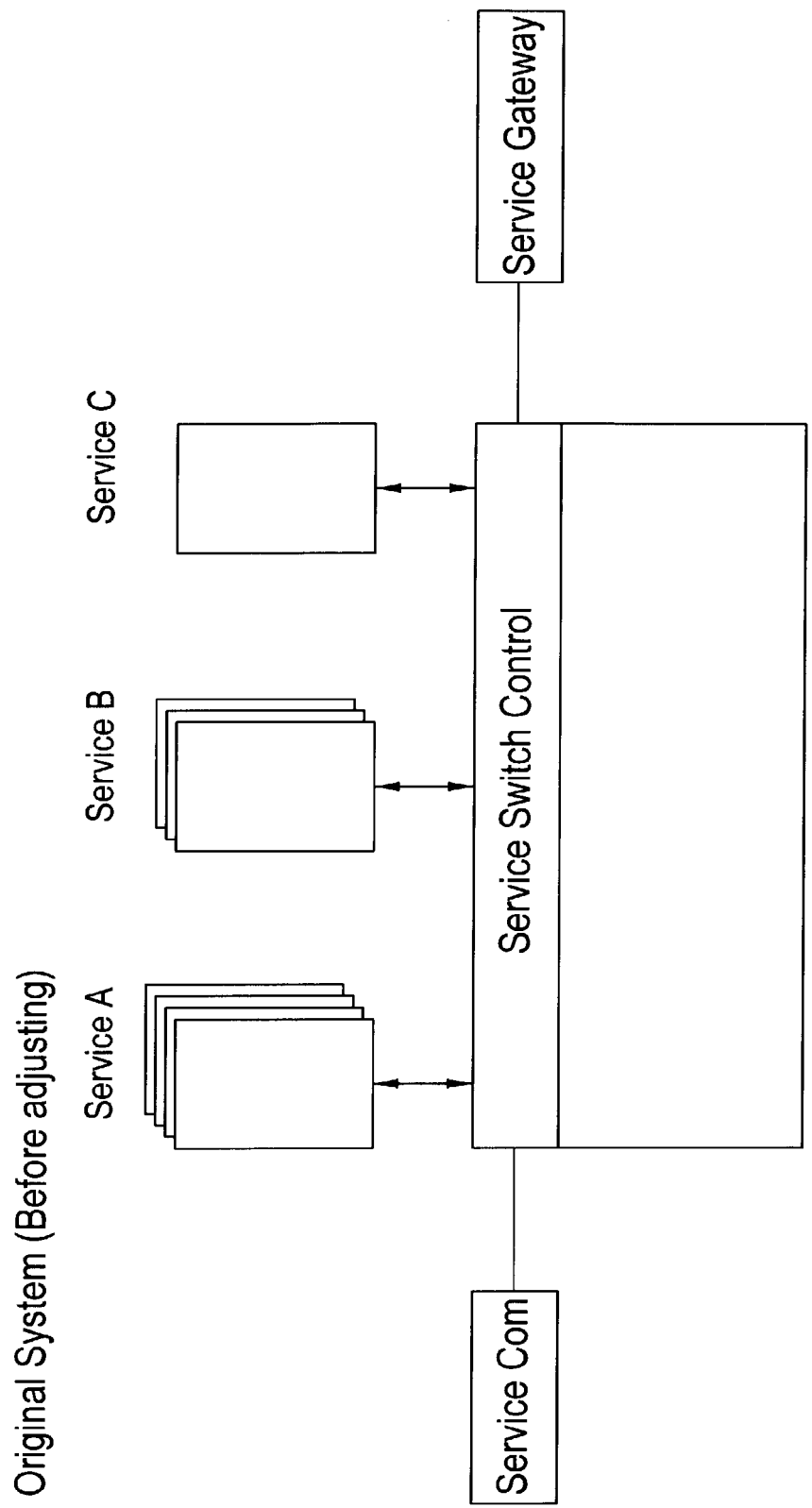
FIG. 29 shows a practical architecture of the original system without processing an on-line service embedding and removing (before adjusting)

Combining the information provided by Service Status Monitor, I/O Message Monitor and System Resource Monitor, the user can easily check I/O status of the system, the service and the message and judge the choke point of the system. In order to make the user to adjust the performing efficiency of the system and service more easily, the present invention specially develops an on-line service embedding and removing which can let the user to remove the service whose performing efficiency is not good enough or which is down under performing the service, and on-line embed newly added transaction session or newly added transaction service is shown in FIG. 29.

Figure 30:
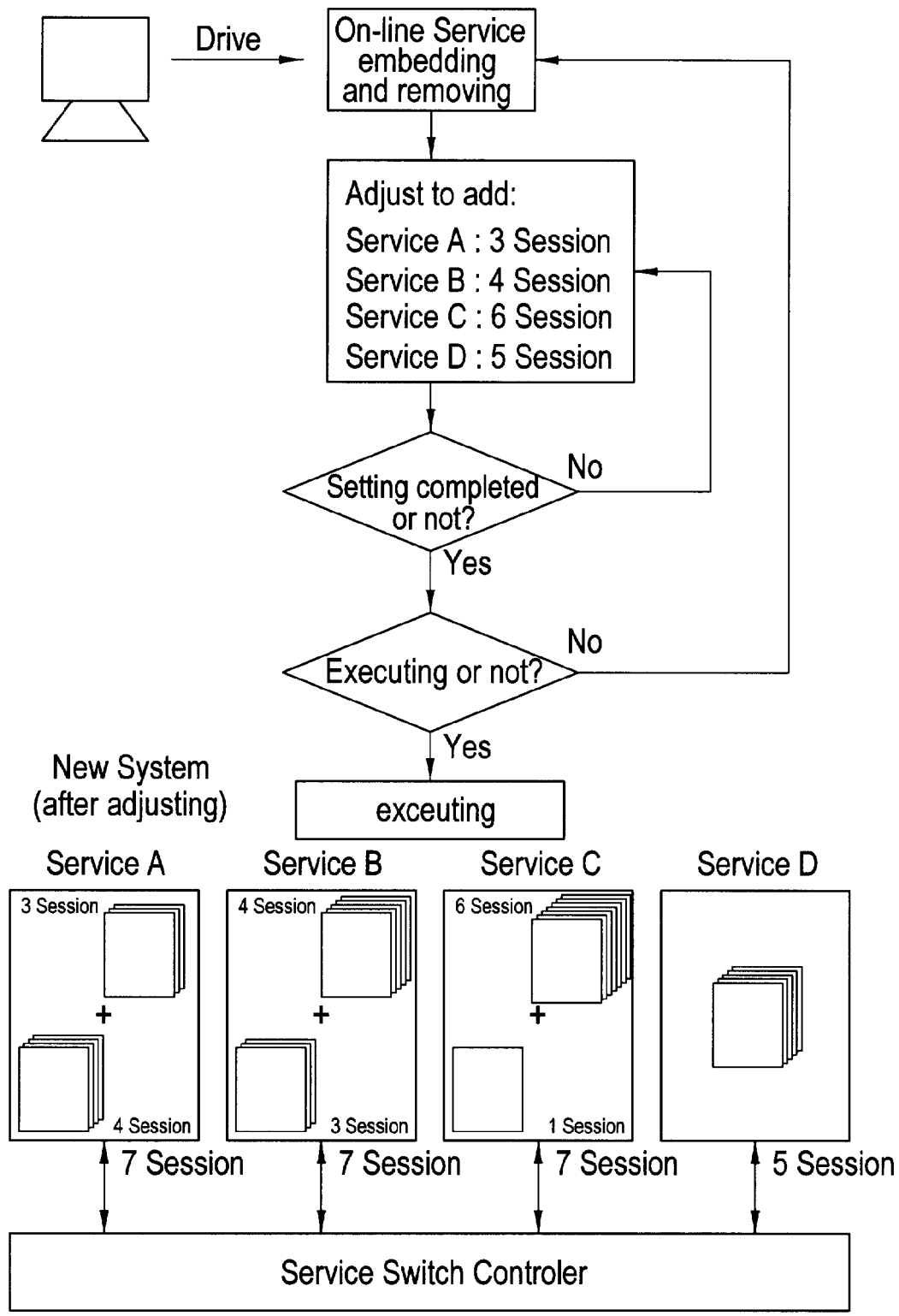
FIG. 30 shows a flow chart and architecture after being adjusted by an on-line service embedding and removing.

When the original system cannot be used anymore, the user can directly drive the on-line service embedding and removing provided by the present invention through the system operating interface. For example, if the original system owns Section A: 4 Session, Service B: 3Session, and Service C: 1 Session, when the user wants to increase Service A-Session, Service B-4 Session, Service C-6 Session and Service D-5 Session, the user doesn't need to previously stop the original system and then adjust the number of the transaction channel, increase transaction service and restart the system. The present invention provides the flow path and architecture of the online service embedding and removing, as shown in FIG. 30.

Figure 31:
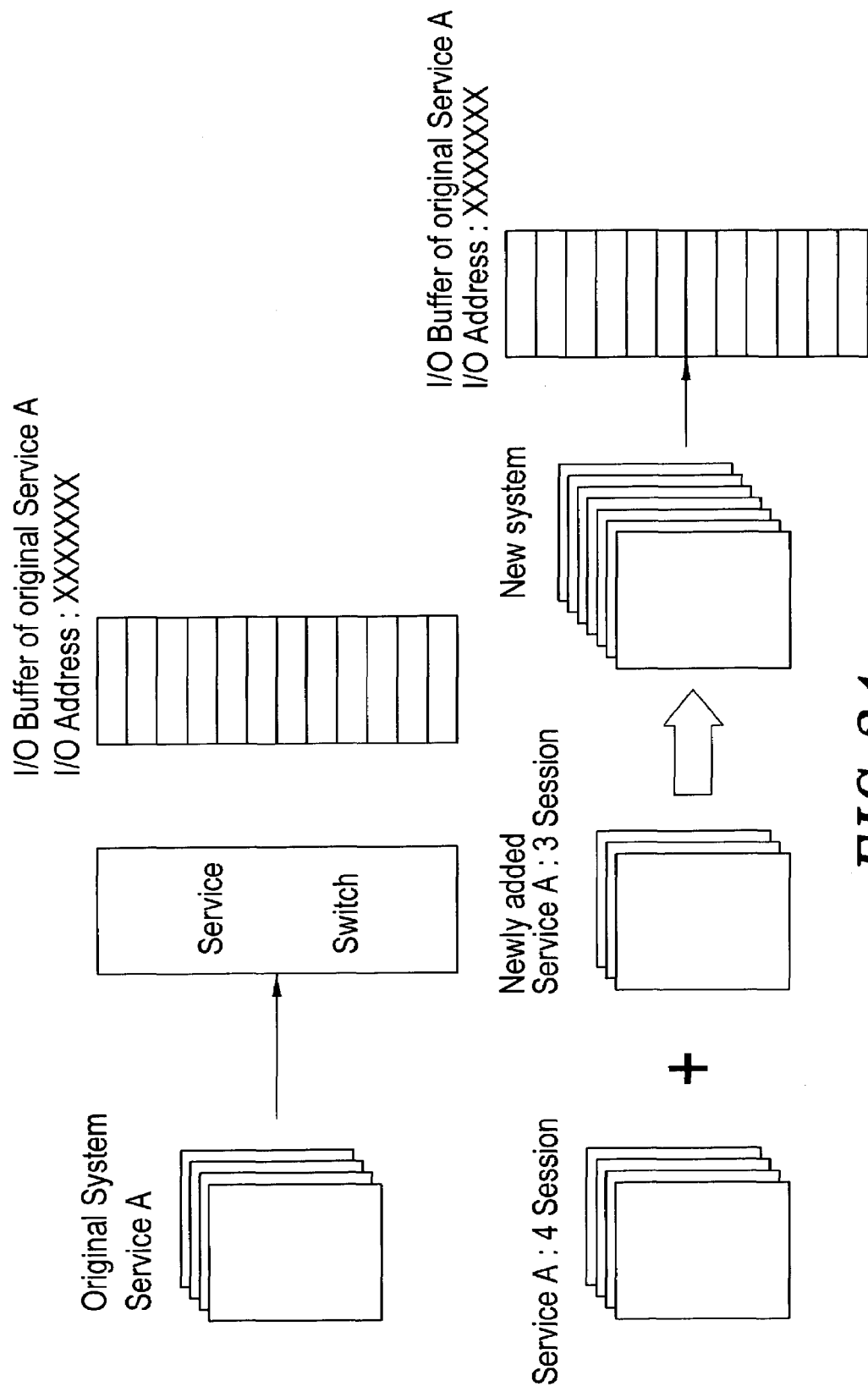
FIG. 31 shows an architecture of the present invention which builds a new transaction session and forms a group with the original transaction session so as to form an auto load balance engine.

The newly added transaction session or newly added transaction service will not influence the original and processing I/O message and will further combine with the original transaction session to be a group and form an ability of auto load balance, as shown in FIG. 31.

When on-line service embedding and removing are initiated, they will depend on the setup demand to perform the situations described as follows:

(1) Find I/O Buffer Address in AIOS Service Table and magnify I/O Buffer for permitting more input data to store therein;

(2) Inform Auto Load Balance Scanner the alternation status;

(3) Add new transaction session or service item in Service Status Monitor for monitoring service status; and (4) Initiate newly added transaction program.

6. Service Stop and AIOS stop

Figure 32:
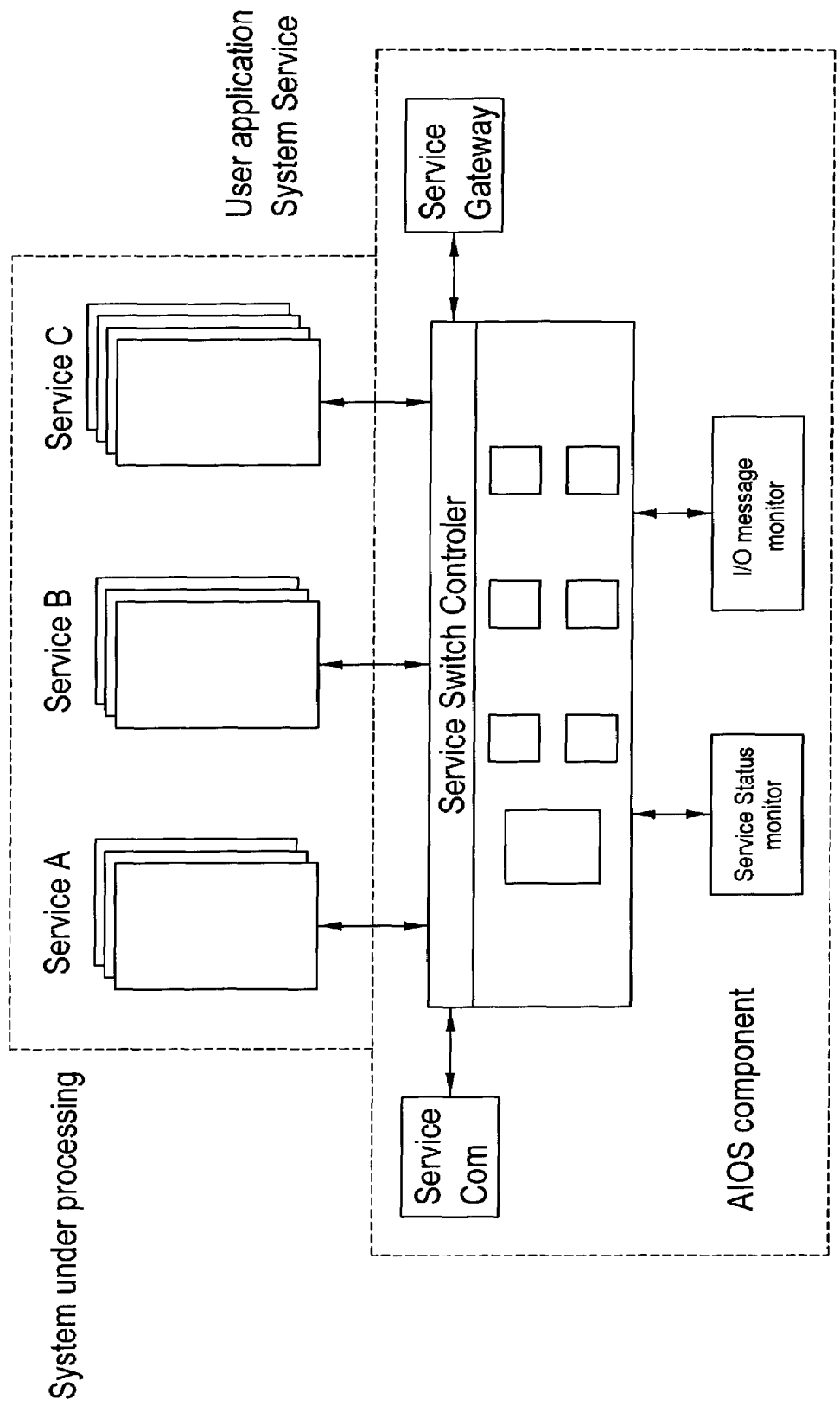
FIG. 32 shows a system architecture when processing according to the present invention.
Figure 33:
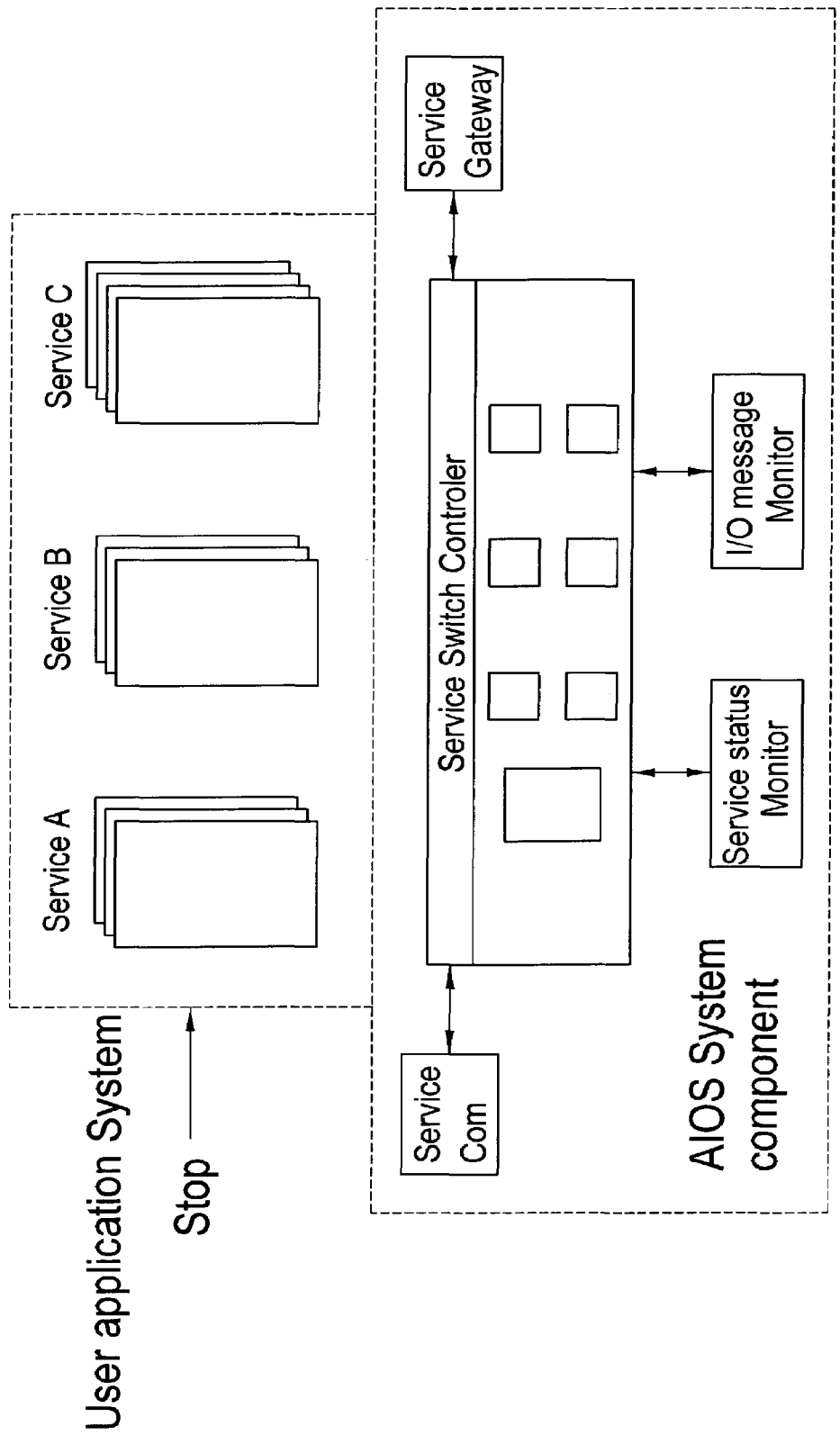
FIG. 33 shows a system architecture to stop the application system by the user according to the present invention.
Figure 34:
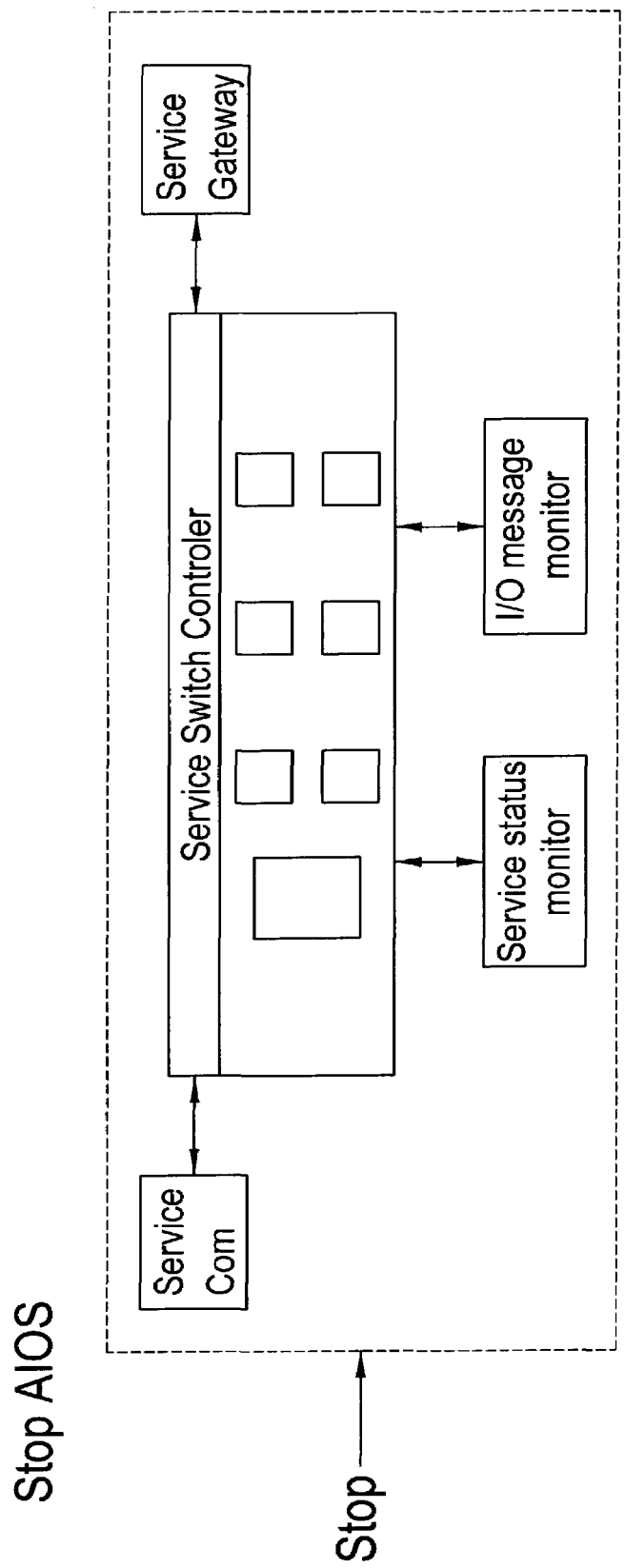
FIG. 34 shows a system architecture of the present invention when stopping the AIOS.

When the user wants to stop AIOS, the system will also terminate the user application system tool and AIOS proceeding tool. This design can let the user to check the status of the unfinished transaction and I/O message from Service Status Monitor and I/O Message Monitor after the user stops the application system service process. Since the user realizes all the conditions and decides to stop the AIOS, the user can remove all AIOS components and all service I/O buffers, refresh the remained message in Service Status Monitor and I/O Message Monitor through the operating interface to initiate AIOS to proceed a stopping tool, as shown in FIGS. 32, 33 and 34.

Figure 35:
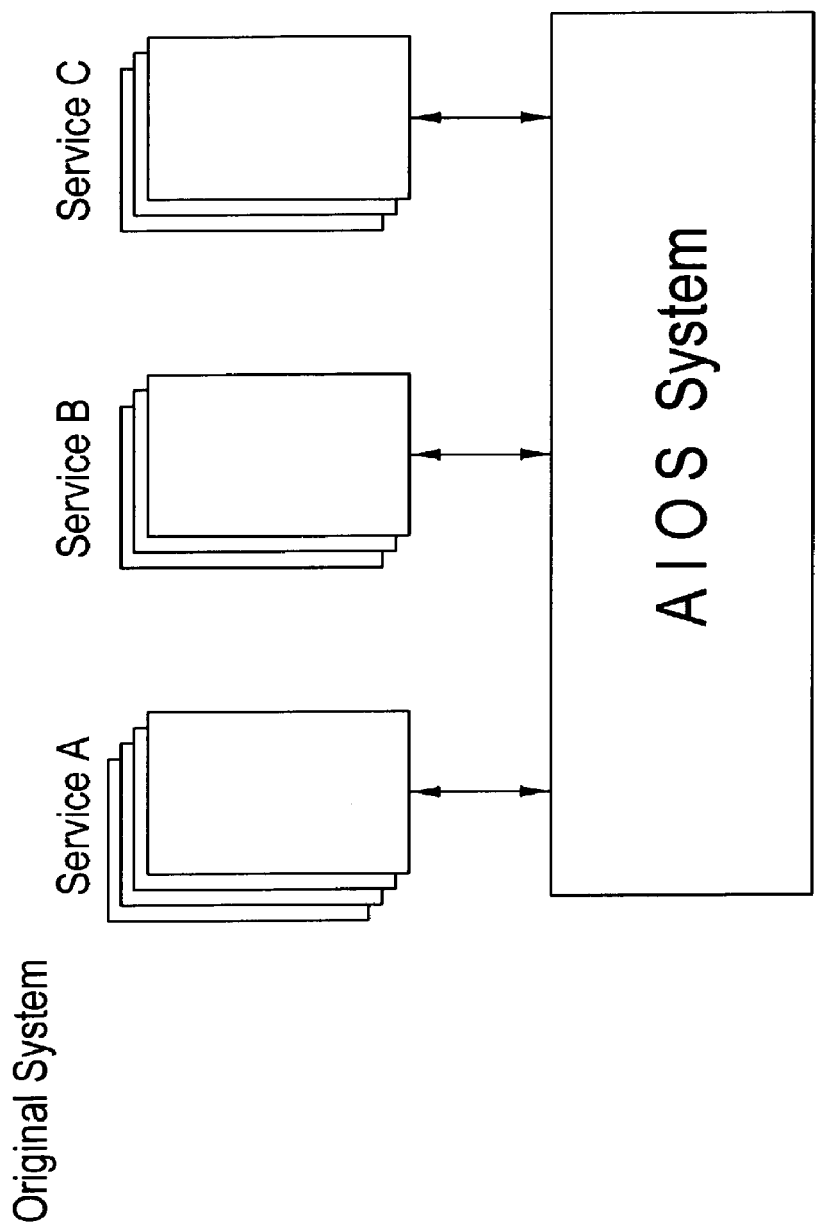
FIG. 35 shows a system architecture when processing before being updated according to the present invention.
Figure 36:
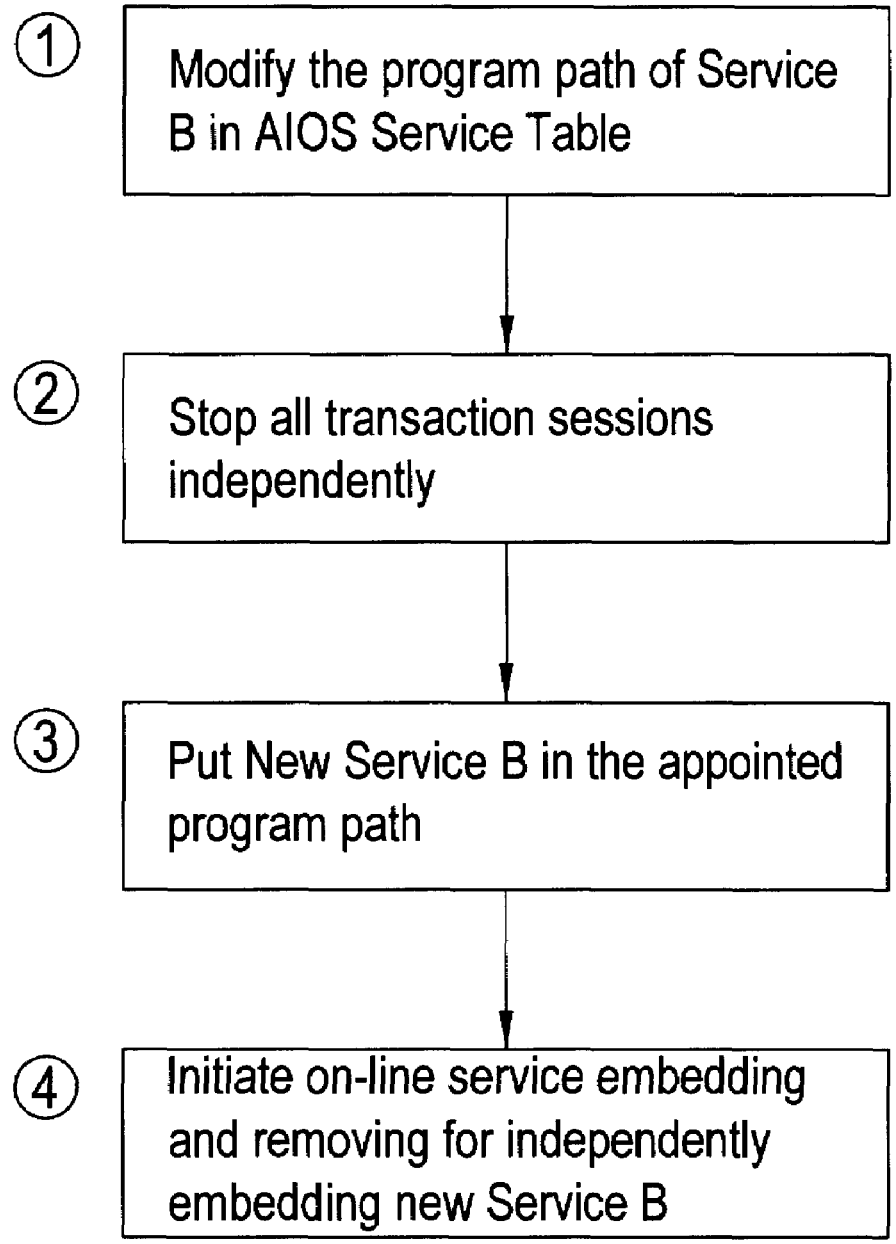
FIG. 36 shows practical steps when the user needs to update a new version according to the present invention.
Figure 37:
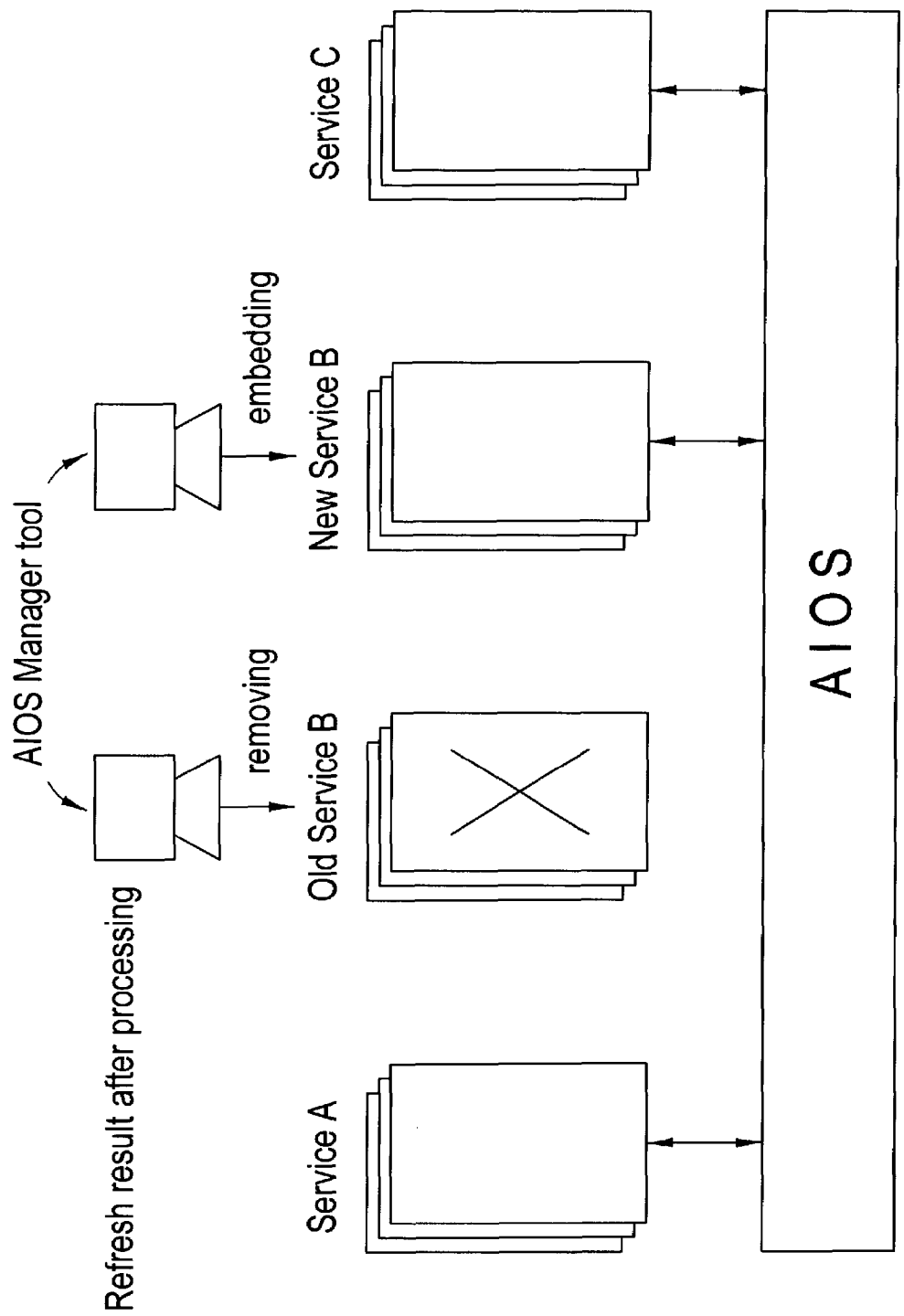
FIG. 37 shows an architecture of the system after being updated according to the present invention.

7. Selectively stop the application system service process and refresh the version of service The system also permits the user to stop some selective application services and processes and then restart the new version application system services and processes. It can refresh the version of the application service through the service stop tool and the simple operation method, as shown in FIGS. 35, 36, and 37.

All the steps described above for refreshing the application system service process can be completed by the user through a graphic (X window/window) operating interface.

8. Data and message log backup

The present invention also provides a backup tool. The user can write the data, log, file, route, and name which are needed for backup in a pitch file through a graphic backup tool. And, it only needs to start the back tool every day, so that all the backup data can be stored as a backup file. The backup tool provided by this system has two storing data formats, Unix format and Dos format, and the modes of storing data include a mode of Unix TAR and a Zip compressed mode. In addition, it also provides a backup data re-store tool, and thus the user not only can check the content of the backup file but can re-store the backup data.

9. AIOS I/O deduction logic

Figure 38:
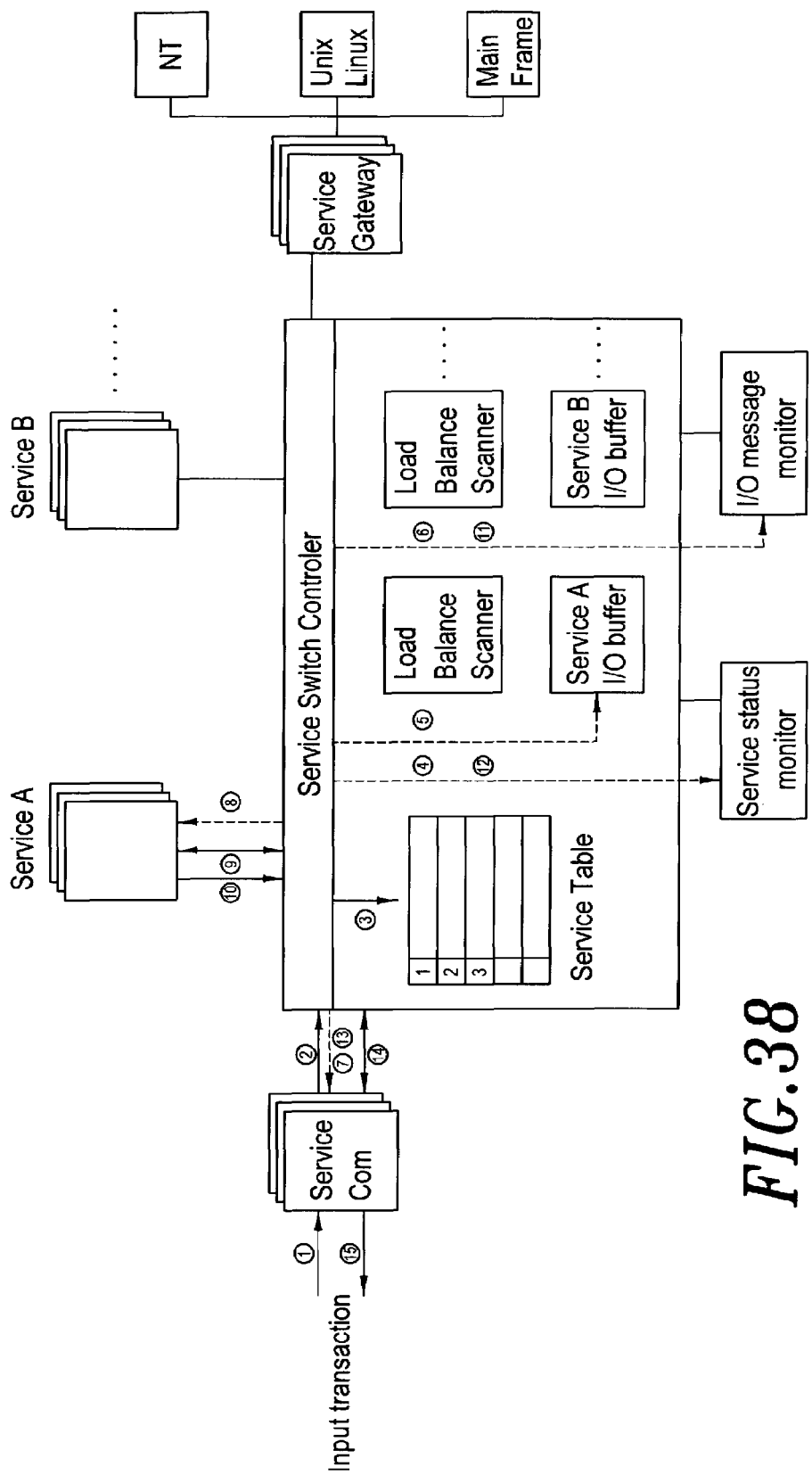
FIG. 38 shows the input/output deductive logic flow chart according to the present invention.

The flow path of AIOS is shown in FIG. 38. The steps of flow path are as follows:

(1) The input transaction is received by Service in Service_Com;

(2) After Service_Com receives the input transaction, it will transmit the transaction message to Service Switch Controller through Send_Service, API;

(3) Service Switch Controller will find the service (e.g., Service A) which should be transmitted by the input message in Service Table set by the user corresponding to Transaction I/O Format which is transmitted therein or the appointed Service Name and further find I/O Buffer Address set in Service A column;

(4) Service Switch Controller will find any left Service A Session from Service Status Monitor, modify thereof, and transmit the status of Session and the status of appointed Service A Session into Service_Com;

(5) The data transmitted from Service_Com is written in Service A I/O Buffer through Load Balance Scanner;

(6) The data transmitted from Service_Com is written in I/O Message Monitor by Service Switch Controller for monitoring the status of I/O Message Status;

(7) After calculating, Service Switch Controller will transmit Session_ID back to Service_Com Session which can proceed an I/O to Service Switch Controller corresponding to Session_ID;

(8) Service Switch Control transmits the calculated Session_ID to Service A Session which is already appointed to be a called service;

(9) Service A Session transmits the obtained Session_ID to Service Switch Controller and requests Service Switch Controller to transmit the input data into Service A Session;

(10) Service A Session will transmit the processed result as Session_ID back to Service Switch Controller;

(11) Service Switch Controller will calculate the value of Session_ID and find the addresses which are occupied by the previously inputted message in I/O Message Monitor, Service Status Monitor, and Service A I/O Buffer and Service Com Session ID transmitted into transaction message calling service and modify the message status of the previously inputted message in I/O Message Monitor;

(12) Modify the service status of Service A Session in Service Status Monitor;

(13) Send signal to inform Service_Com Session to read the processing result of the inputted message;

(14) Service_Com Session will transmit the result back to Service Switch Control corresponding to the previous Session_ID, request Service Switch Controller to explain the value of Session_ID and find the location of the processing result of the inputted message which will be then transmitted back to Service Corn Session, and the service status of Service Corn Session in Service Status Monitor and the processing result of inputted message will be modified and the processing status of the message can be realized in I/O message monitor; and

(15) After Service Corn Session receives the processing result of transaction message, it will transmit the processing result back to the input end.

10. Transaction Session_ID

The transaction session_ID is a numeral code having 7 to 12 numbers. The production of Session_ID is depended on the information of (1) Process ID; (2) Calling Service Name; (3) Called Service I/O Buffer Address; (4) The location of Calling Service in Service Status Monitor; (5) The location of input transaction message in I/O Message Monitor; (6) Called service Name of Called Service; and (7) Process ID of the inputted message and is a calculated independent code. This kind of design can improve the performing efficiency of Service Switch Controller, namely any Service Switch Controller Session can interpret the containing meaning of Session_ID. Each transaction request which is passed through Service Switch Controller can be completed by any Session in different Service Switch Controller, namely, from input to the end of processing, an input message is continuously completed by different Service Switch Session, wherein the connection of the transaction is established by Session_ID.

The application infa operating system according to the present invention, when being compared with the other prior arts, further includes the advantages as follows:

1. The time for developing the application system can be reduced.

2. The cost for developing the application system can be saved.

3. The old man power can be continuously used.

4. The cost for maintaining the application system can be reduced.

5. The demand of future expansion can be satisfied.

6. The performing efficiency of the application system can be improved.

7. The operation for managing the application can be simplified.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An Application Infa Operating System (AIOS), comprising: a system manager tool, an AIOS foundation system and a service embedded component of an application system to utilize a designing logic of a concurrent process, a reciprocal architecture of a Service To Service process and a manager-oriented logic intellect for providing an operating platform for integrating, embedding, managing and controlling said application program, whereby different application programs which are developed from different information companies and different program designers via different programming languages are integrated by said AIOS for mutually conversing and swapping data at different spacetimes; said AIOS including a man machine interface (MMI) and a software tool for overall control of said application program; and a graphical backup tool for storing selected data to a backup file that has been identified in a batch file, said graphical backup tool including selection of one of two data storage formats for said selected data stored in said backup file.

2. The AIOS according to claim 1, wherein said designing logic of said concurrent process provides for every service being embedded in said AIOS to be a service component therein, and using a program compiler and a library link to directly and independently record a service name of a called service in a text file beyond said program without a program compilation.

3. The AIOS according to claim 1, wherein said reciprocal architecture of said Service To Service process includes a one-to-many program conversation to provide said application program with a distributing process and a concurrent process.

4. The AIOS according to claim 1, wherein said manager-oriented logic intellect provides each service with a relative argument and an I/O data format table for assisting a user to manage and maintain said application system.

5. The AIOS according to claim 1, wherein said system manager tool comprises: a manager tool for setting a fundamental system and an embedded component, a manager tool for setting an embedded service component I/O format, a manager tool for initiating, refreshing and stopping said fundamental system, a manager tool for embedding and removing said service component, a manager tool for on-line embedding and removing a newly added component and a transaction session, a display for monitoring a real-time service status and an I/O data process, and a manager tool for re-storing a data and log backup.

6. The AIOS according to claim 5, wherein said system manager tool is set by said AIOS, and initiation of said system, embedding and removing of said service component, embedding, removing and refreshing of said on-line service component and said transaction session, monitoring and adjusting of a performing efficiency of said application system, stopping of said service component and said AIOS system, and data backup and re-storing are totally completed in a menu of an identical manager item.

7. The AIOS according to claim 5, wherein said manager tool for embedding and removing said on-line newly added component and said transaction session permits a user to increase said service and said transaction session to form a service group with said original transaction session without stopping said operating of said application system, automatically shares a loading of said original transaction session to reach a performance load balance, and also permits the user to directly remove said service in a down process and simultaneously increase a newly added substitution transaction session or a refresh version of said service.

8. The AIOS according to claim 5, wherein said display for monitoring said real-time service status and said I/O data process, except embedding a service status monitor and an I/O data status monitor in said fundamental system, further provides two monitor manager tools for a manager to monitor said embedded service component and a flow direction of said I/O data, said manager checking a real-time content of said two monitors for achieving an overall control.

9. The AIOS according to claim 1, wherein said service I/O data format manager provides an I/O data format table of all embedded services to simplify a usage of said application system and service.

10. The AIOS according to claim 1, wherein said fundamental system architecture comprises: a service switch controller, a service status monitor, an I/O data monitor, a cross-system service gateway, a cross-system input receiver, a service component embedding, and a multi-session controller.

11. The AIOS according to claim 10, wherein said service switch controller comprises: an I/O data format control interface, an embedded-process recorder, plural service component input buffers, an I/O buffer scanner & auto load balance engine, and a service switch process.

12. The AIOS according to claim 1, wherein said system includes distributed processing and a concurrent processing of said application system, includes a multi transaction session performance load balance, includes a recursion calling and a cross calling of said application system, includes an on-line service embedding transaction session of said application system, includes a monitor of all services embedded in said system, includes a whole course monitoring of an I/O message, includes an adjusting and monitoring of said a performing efficiency of said application system, and includes a standard manager interface for integrating.

13. The AIOS according to claim 1, wherein said fundamental system includes an auto load balance engine and an I/O buffer and also provides different input buffers and buffer auto load balance engines to each different embedded service component, and when there is an input, a left service component will be found in said service status monitor and said service component will be informed to receive and process said input.

14. The AIOS according to claim 1, wherein said fundamental system provides an on-line embedding of a newly added transaction session for forming a common service group with said original transaction session and provides an auto load balance.

* * * * *